(12) United States Patent
Dojan et al.

(10) Patent No.: US 7,086,180 B2
(45) Date of Patent: *Aug. 8, 2006

(54) ARTICLE OF FOOTWEAR HAVING A FLUID-FILLED BLADDER WITH A REINFORCING STRUCTURE

(75) Inventors: Frederick J. Dojan, Vancouver, WA (US); Thomas Foxen, Portland, OR (US); John F. Swigart, Portland, OR (US); Eric Steven Schindler, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/767,212

(22) Filed: Jan. 28, 2004

(65) Prior Publication Data

US 2005/0132608 A1     Jun. 23, 2005

Related U.S. Application Data

(60) Provisional application No. 60/531,674, filed on Dec. 23, 2003.

(51) Int. Cl.
*A43B 13/20* (2006.01)
(52) U.S. Cl. .......................................................... 36/29
(58) Field of Classification Search ................... 36/29, 36/35 B, 153
See application file for complete search history.

(56) References Cited

U.S. PATENT DOCUMENTS

| | | | |
|---|---|---|---|
| 900,867 A | 10/1908 | Miller |
| 1,069,001 A | 7/1913 | Guy |
| 1,240,153 A | 9/1917 | Olsen |
| 1,304,915 A | 5/1919 | Spinney |
| 1,323,610 A | 12/1919 | Price |
| 1,514,468 A | 11/1924 | Schopf |
| 1,584,034 A | 5/1926 | Klotz |
| 1,625,582 A | 4/1927 | Anderson |
| 1,625,810 A | 4/1927 | Krichbaum |
| 1,869,257 A | 7/1932 | Hitzler |
| 1,916,483 A | 7/1933 | Krichbaum |
| 1,970,803 A | 8/1934 | Johnson |
| 2,004,906 A | 6/1935 | Simister |
| 2,080,469 A | 5/1937 | Gilbert |
| 2,086,389 A | 7/1937 | Pearson |
| 2,269,342 A | 1/1942 | Johnson |
| 2,365,807 A | 12/1944 | Dialynas |
| 2,488,382 A | 11/1949 | Davis |

(Continued)

FOREIGN PATENT DOCUMENTS

AU          181938          2/1906

(Continued)

OTHER PUBLICATIONS

Sports Research Review, NIKE, Inc., Jan./Feb. 1990.

(Continued)

*Primary Examiner*—Ted Kavanaugh
(74) *Attorney, Agent, or Firm*—Banner & Witcoff, Ltd.

(57) ABSTRACT

A sole component and a method of manufacturing the sole component are disclosed. In general, the sole component includes a fluid-filled bladder and a reinforcing structure extending around the bladder. The reinforcing structure is bonded to the exterior of the bladder, and may be recessed into the bladder. In some embodiments, the reinforcing structure extends along the side surfaces of the bladder and between upper and lower surfaces of bladder. In manufacturing the sole component, the reinforcing structure may be located within a mold, and the polymer material forming the bladder may be bonded to the reinforcing structure during the molding process.

32 Claims, 32 Drawing Sheets

U.S. PATENT DOCUMENTS

| | | |
|---|---|---|
| 2,546,827 A | 3/1951 | Lavinthal |
| 2,600,239 A | 6/1952 | Gilbert |
| 2,645,865 A | 7/1953 | Town |
| 2,677,906 A | 5/1954 | Reed |
| 2,703,770 A | 3/1955 | Melzer |
| 2,748,401 A | 6/1956 | Winstead |
| 2,762,134 A | 9/1956 | Town |
| 3,030,640 A | 4/1962 | Gosman |
| 3,048,514 A | 8/1962 | Bentele et al. |
| 3,120,712 A | 2/1964 | Menken |
| 3,121,430 A | 2/1964 | O'Reilly |
| 3,160,963 A | 12/1964 | Aaskov |
| 3,204,678 A | 9/1965 | Worcester |
| 3,251,076 A | 5/1966 | Burke |
| 3,284,264 A | 11/1966 | O'Rourke |
| 3,335,045 A | 8/1967 | Post |
| 3,366,525 A | 1/1968 | Jackson |
| 3,469,576 A | 9/1969 | Smith et al. |
| 3,568,227 A | 3/1971 | Dunham |
| 3,589,037 A | 6/1971 | Gallagher |
| 3,608,215 A | 9/1971 | Fukuoka |
| 3,685,176 A | 8/1972 | Rudy |
| 3,758,964 A | 9/1973 | Nishimura |
| 3,765,422 A | 10/1973 | Smith |
| 4,017,931 A | 4/1977 | Golden |
| 4,054,960 A | 10/1977 | Pettit et al. |
| 4,115,934 A | 9/1978 | Hall |
| 4,129,951 A | 12/1978 | Petrosky |
| 4,167,795 A | 9/1979 | Lambert, Jr. |
| 4,183,156 A | 1/1980 | Rudy |
| 4,187,620 A | 2/1980 | Selner |
| 4,217,705 A | 8/1980 | Donzis |
| 4,219,945 A | 9/1980 | Rudy |
| 4,271,606 A | 6/1981 | Rudy |
| 4,287,250 A | 9/1981 | Rudy |
| 4,292,702 A | 10/1981 | Phillips |
| 4,297,797 A | 11/1981 | Meyers |
| 4,305,212 A | 12/1981 | Coomer |
| 4,328,599 A | 5/1982 | Mollura |
| 4,358,902 A | 11/1982 | Cole et al. |
| 4,431,003 A | 2/1984 | Sztancsik |
| 4,446,634 A | 5/1984 | Johnson et al. |
| 4,458,430 A | 7/1984 | Peterson |
| 4,483,030 A | 11/1984 | Plick et al. |
| 4,486,964 A | 12/1984 | Rudy |
| 4,506,460 A | 3/1985 | Rudy |
| 4,547,919 A | 10/1985 | Wang |
| 4,662,087 A | 5/1987 | Beuch |
| 4,670,995 A | 6/1987 | Huang |
| 4,686,130 A | 8/1987 | Kon |
| 4,722,131 A | 2/1988 | Huang |
| 4,744,157 A | 5/1988 | Dubner |
| 4,779,359 A | 10/1988 | Famolare, Jr. |
| 4,782,602 A | 11/1988 | Lakic |
| 4,803,029 A | 2/1989 | Iversen et al. |
| 4,817,304 A * | 4/1989 | Parker et al. .................. 36/114 |
| 4,823,482 A | 4/1989 | Lakic |
| 4,845,338 A | 7/1989 | Lakic |
| 4,845,861 A | 7/1989 | Moumgdgian |
| 4,864,738 A | 9/1989 | Horovitz et al. |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,936,029 A | 6/1990 | Rudy |
| 4,965,899 A | 10/1990 | Sekido et al. |
| 4,972,611 A | 11/1990 | Swartz et al. |
| 4,991,317 A | 2/1991 | Lakic |
| 4,999,931 A | 3/1991 | Vermeulen |
| 4,999,932 A | 3/1991 | Grim |
| 5,005,299 A | 4/1991 | Whatley |
| 5,014,449 A | 5/1991 | Richard et al. |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,046,267 A | 9/1991 | Kilgore et al. |
| 5,060,401 A | 10/1991 | Whatley |
| 5,083,361 A | 1/1992 | Rudy |
| 5,104,477 A | 4/1992 | Williams et al. |
| 5,155,927 A | 10/1992 | Bates et al. |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,238,231 A | 8/1993 | Huang |
| 5,245,766 A | 9/1993 | Warren |
| 5,253,435 A | 10/1993 | Auger et al. |
| 5,257,470 A | 11/1993 | Auger et al. |
| 5,279,051 A | 1/1994 | Whatley |
| 5,297,349 A | 3/1994 | Kilgore |
| 5,335,382 A | 8/1994 | Huang |
| 5,337,492 A | 8/1994 | Anderie et al. |
| 5,353,459 A | 10/1994 | Potter et al. |
| 5,353,523 A | 10/1994 | Kilgore et al. |
| 5,355,552 A | 10/1994 | Huang |
| 5,363,570 A * | 11/1994 | Allen et al. .................. 36/28 |
| 5,367,791 A | 11/1994 | Gross et al. |
| 5,406,719 A | 4/1995 | Potter |
| 5,425,184 A * | 6/1995 | Lyden et al. .................. 36/29 |
| 5,440,826 A | 8/1995 | Whatley |
| 5,493,792 A | 2/1996 | Bates et al. |
| 5,543,194 A | 8/1996 | Rudy |
| 5,558,395 A | 9/1996 | Huang |
| 5,572,804 A | 11/1996 | Skaja et al. |
| 5,595,004 A | 1/1997 | Lyden et al. |
| 5,598,645 A | 2/1997 | Kaiser et al. |
| 5,625,964 A | 5/1997 | Lyden et al. |
| 5,669,161 A | 9/1997 | Huang |
| 5,686,167 A | 11/1997 | Rudy |
| 5,713,141 A | 2/1998 | Mitchell et al. |
| 5,741,568 A | 4/1998 | Rudy |
| 5,753,061 A | 5/1998 | Rudy |
| 5,755,001 A | 5/1998 | Potter et al. |
| 5,771,606 A | 6/1998 | Litchfield et al. |
| 5,802,739 A | 9/1998 | Potter et al. |
| 5,830,553 A | 11/1998 | Huang |
| 5,832,630 A | 11/1998 | Potter |
| 5,846,063 A | 12/1998 | Lakic |
| 5,902,660 A | 5/1999 | Huang |
| 5,907,911 A | 6/1999 | Huang |
| 5,916,664 A | 6/1999 | Rudy |
| 5,925,306 A | 7/1999 | Huang |
| 5,930,918 A * | 8/1999 | Healy et al. .................. 36/29 |
| 5,937,462 A | 8/1999 | Huang |
| 5,952,065 A | 9/1999 | Mitchell et al. |
| 5,976,451 A | 11/1999 | Skaja et al. |
| 5,979,078 A | 11/1999 | McLaughlin |
| 5,987,780 A | 11/1999 | Lyden et al. |
| 5,993,585 A | 11/1999 | Goodwin et al. |
| 6,009,637 A * | 1/2000 | Pavone .................. 36/29 |
| 6,013,340 A | 1/2000 | Bonk et al. |
| 6,027,683 A | 2/2000 | Huang |
| 6,029,962 A | 2/2000 | Shorten et al. |
| 6,055,746 A | 5/2000 | Lyden et al. |
| 6,065,150 A | 5/2000 | Huang |
| 6,098,313 A | 8/2000 | Skaja |
| 6,119,371 A | 9/2000 | Goodwin et al. |
| 6,127,010 A | 10/2000 | Rudy |
| 6,128,837 A | 10/2000 | Huang |

| | | | |
|---|---|---|---|
| 6,158,149 A * | 12/2000 | Rudy | 36/29 |
| 6,253,466 B1 | 7/2001 | Harmon-Weiss et al. | |
| 6,374,514 B1 | 4/2002 | Swigart | |
| 6,665,958 B1 * | 3/2003 | Goodwin | 36/29 |
| 6,783,184 B1 | 8/2004 | DiBattista et al. | |
| 6,918,198 B1 * | 7/2005 | Chi | 36/29 |
| 2001/0042321 A1 | 11/2001 | Tawney et al. | |
| 2003/0051373 A1 | 3/2003 | Goodwin | |
| 2005/0132607 A1 * | 6/2005 | Dojan et al. | 36/29 |
| 2005/0132609 A1 * | 6/2005 | Dojan et al. | 36/29 |
| 2005/0132610 A1 * | 6/2005 | Foxen et al. | 36/29 |

FOREIGN PATENT DOCUMENTS

| | | |
|---|---|---|
| AU | 200963 | 12/1958 |
| CA | 727582 | 2/1996 |
| CN | 75100322 | 1/1975 |
| CN | 54221 | 6/1978 |
| DE | 32 34 086 | 9/1982 |
| DE | G92 01 758.4 | 12/1992 |
| EP | 0 094 868 | 5/1983 |
| EP | 0 215 974 A1 | 9/1985 |
| EP | 0 605 485 B1 | 9/1992 |
| EP | 0 893 074 | 1/1999 |
| FR | 1195549 | 11/1959 |
| FR | 1406610 | 11/1965 |
| FR | 2144464 | 1/1973 |
| FR | 2404413 | 4/1979 |
| FR | 2407008 | 5/1979 |
| FR | 2483321 | 4/1981 |
| FR | 2614510 | 4/1987 |
| FR | 2.639537 | 11/1988 |
| GB | 7441 | 0/1906 |
| GB | 14955 | 0/1893 |
| GB | 233387 | 1/1924 |
| GB | 978654 | 12/1964 |
| GB | 1128764 | 10/1968 |
| JP | 266718 | 9/1992 |
| JP | 6-181802 | 7/1994 |
| WO | WO89/10074 | 11/1989 |
| WO | WO90/10396 | 9/1990 |
| WO | WO91/11928 | 8/1991 |
| WO | WO91/11931 | 8/1991 |
| WO | WO92/08384 | 5/1992 |
| WO | WO95/20332 | 8/1995 |
| WO | WO 2005/016051 | 2/2005 |

OTHER PUBLICATIONS

Brooks Running Catalog, Fall 1991.
International Search Report in corresponding PCT application, International Application No. PCT/2004/042596, mailed Dec. 21, 2005.

* cited by examiner

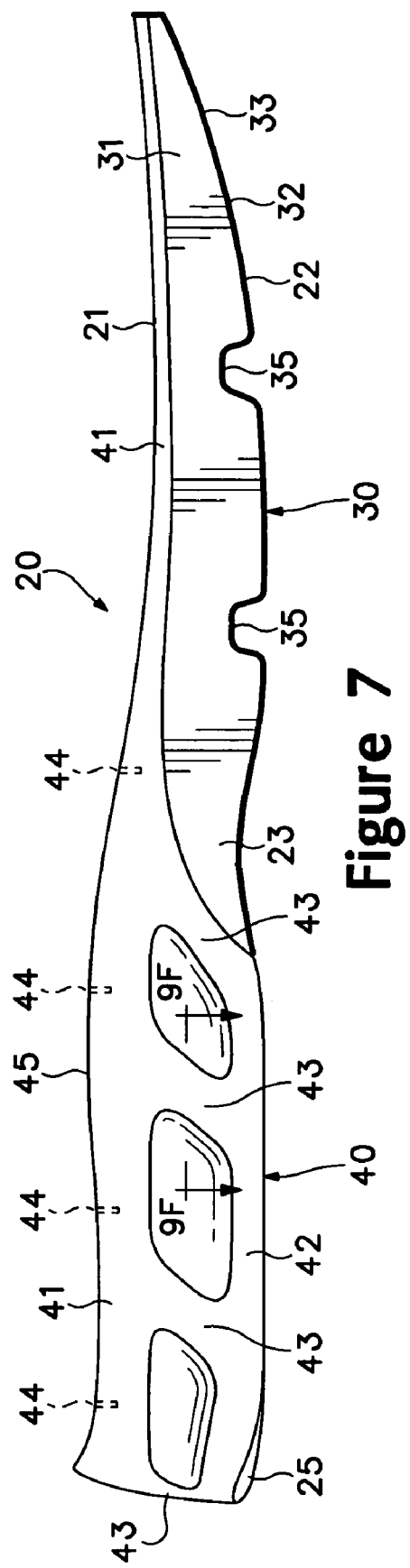
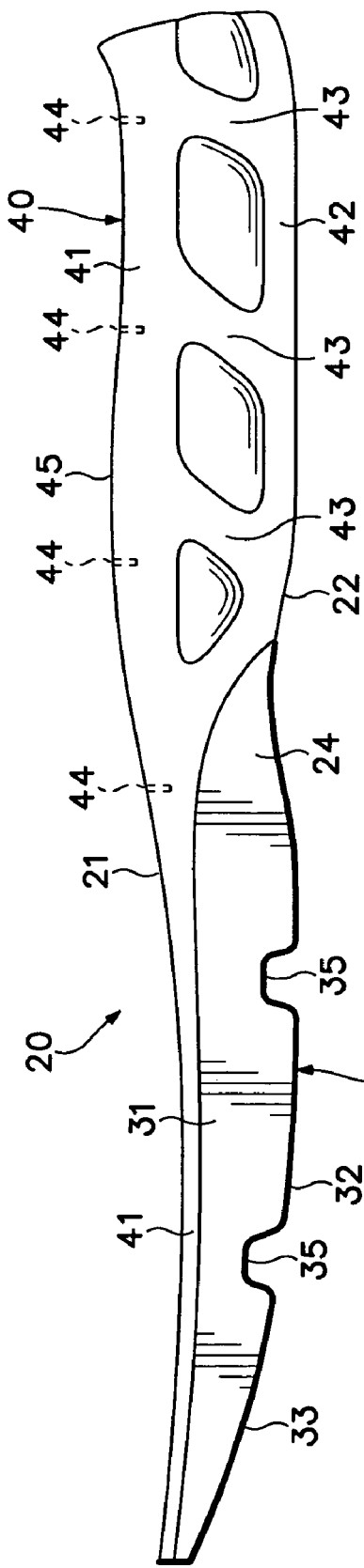
Figure 7
Figure 8

ARTICLE OF FOOTWEAR HAVING A FLUID-FILLED BLADDER WITH A REINFORCING STRUCTURE

CROSS-REFERENCE TO RELATED APPLICATION

This non-provisional U.S. Patent Application claims priority to provisional U.S. patent application Ser. No. 60/531,674, which was filed in the U.S. Patent and Trademark Office on Dec. 23, 2003 and entitled Article Of Footwear Having A Fluid-Filled Bladder With A Reinforcing Structure, such provisional U.S. Patent Application being entirely incorporated herein by reference.

BACKGROUND OF THE INVENTION

1. Field of the Invention

The present invention relates to footwear. The invention concerns, more particularly, a sole component for an article of footwear and a method of manufacturing the sole component. Although the configuration of the sole component may vary significantly within the scope of the present invention, the sole component generally includes a fluid-filled bladder and an external reinforcing structure secured to the bladder.

2. Description of Background Art

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces and absorbing energy (i.e., imparting cushioning), the sole structure may provide traction and control foot motions, such as over pronation. Accordingly, the upper and the sole structure operate cooperatively to provide a comfortable structure that is suited for a wide variety of ambulatory activities, such as walking and running.

The sole structure of athletic footwear generally exhibits a layered configuration that includes a comfort-enhancing insole, a resilient midsole formed from a polymer foam, and a ground-contacting outsole that provides both abrasion-resistance and traction. Suitable polymer foam materials for the midsole include ethylvinylacetate or polyurethane that compress resiliently under an applied load to attenuate ground reaction forces and absorb energy. Conventional polymer foam materials are resiliently compressible, in part, due to the inclusion of a plurality of open or closed cells that define an inner volume substantially displaced by gas. That is, the polymer foam includes a plurality of bubbles that enclose the gas. Following repeated compressions, the cell structure may deteriorate, thereby resulting in decreased compressibility of the foam. Accordingly, the force attenuation and energy absorption characteristics of the midsole may decrease over the lifespan of the footwear.

One manner of reducing the weight of a polymer foam midsole and decreasing the effects of deterioration following repeated compressions is disclosed in U.S. Pat. No. 4,183,156 to Rudy, hereby incorporated by reference, in which cushioning is provided by a fluid-filled bladder formed of an elastomeric materials. The bladder includes a plurality of tubular chambers that extend longitudinally along a length of the sole structure. The chambers are in fluid communication with each other and jointly extend across the width of the footwear. The bladder may be encapsulated in a polymer foam material, as disclosed in U.S. Pat. No. 4,219,945 to Rudy, hereby incorporated by reference. The combination of the bladder and the encapsulating polymer foam material functions as a midsole. Accordingly, the upper is attached to the upper surface of the polymer foam material and an outsole or tread member is affixed to the lower surface.

Bladders of the type discussed above are generally formed of an elastomeric material and are structured to have an upper and lower portions that enclose one or more chambers therebetween. The chambers are pressurized above ambient pressure by inserting a nozzle or needle connected to a fluid pressure source into a fill inlet formed in the bladder. Following pressurization of the chambers, the fill inlet is sealed and the nozzle is removed.

Fluid-filled bladders suitable for footwear applications may be manufactured by a two-film technique, in which two separate sheets of elastomeric film are formed to exhibit the overall peripheral shape of the bladder. The sheets are then bonded together along their respective peripheries to form a sealed structure, and the sheets are also bonded together at predetermined interior areas to give the bladder a desired configuration. That is, the interior bonds provide the bladder with chambers having a predetermined shape and size. Such bladders have also been manufactured by a blow-molding technique, wherein a molten or otherwise softened elastomeric material in the shape of a tube is placed in a mold having the desired overall shape and configuration of the bladder. The mold has an opening at one location through which pressurized air is provided. The pressurized air induces the liquefied elastomeric material to conform to the shape of the inner surfaces of the mold. The elastomeric material then cools, thereby forming a bladder with the desired shape and configuration.

SUMMARY OF THE INVENTION

The present invention is an article of footwear incorporating a sole component that includes a bladder and a reinforcing structure. The bladder is formed of a barrier material, and the bladder encloses a pressurized fluid that exerts an outward force upon the barrier material. The reinforcing structure is at least partially recessed into the barrier material and bonded to the barrier material. At least a portion of the reinforcing structure may be placed in tension by the outward force upon the barrier material. The reinforcing structure may also restrain distension or outwardly-directed swelling of the bladder due to the outward force upon the barrier material, and the reinforcing structure may be formed of a material with a greater modulus of elasticity than the barrier material.

The bladder may include a first surface and an opposite second surface. The first surface may be joined to the second surface by a plurality of interior bonds that are spaced inward from a sidewall of the bladder. In addition, the bladder may include at least one flexion indentation formed in the second surface, the indentation may extend, for example, from a lateral side of the bladder to a medial side of the bladder. As an alternative, the indentation may extend in a generally longitudinal direction. At least one of the interior bonds may join the first surface with the indentation.

The reinforcing structure may include a first portion, a second portion, and a plurality of connecting portions. The first portion may be positioned at an interface of the first surface and the sidewall, and the first portion may extend along a lateral side of the bladder, around a heel region of the bladder, and along a medial side of the bladder. The second portion may be spaced from the first portion and positioned at an interface of the second surface and the sidewall. In addition, the second portion may extend along the lateral side, around the heel region, and along a medial side of the bladder. The connecting portions may extend along the sidewall and between the first portion and the second portion, with the connecting portions being recessed into sidewall. The connecting portions may also be inclined with respect to the first portion and the second portion.

Another aspect of the present invention involves a method of manufacturing a sole component for an article of footwear. The method includes the steps of molding a fluid-filled bladder from a polymer material, recessing a reinforcing member into the bladder, and bonding the reinforcing member to the bladder. Accordingly, the reinforcing member may be placed within the mold prior to introducing the polymer material forming the bladder.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 7 is a first side elevational view of the first sole component.

FIG. 8 is a second side elevational view of the first sole component.

DETAILED DESCRIPTION OF THE INVENTION

Introduction

The following discussion and accompanying figures disclose various embodiments of a sole component suitable for footwear applications. In addition, a method of manufacturing the sole component is disclosed. Concepts related to the sole component and manufacturing method are disclosed with reference to footwear having a configuration that is suitable for running. The sole component is not limited solely to footwear designed for running, and may be applied to a wide range of athletic footwear styles, including basketball shoes, cross-training shoes, walking shoes, tennis shoes, soccer shoes, and hiking boots, for example. The sole component may also be applied to footwear styles that are generally considered to be non-athletic, including dress shoes, loafers, sandals, and work boots. The concepts disclosed herein apply, therefore, to a wide variety of footwear styles.

Figure 1:
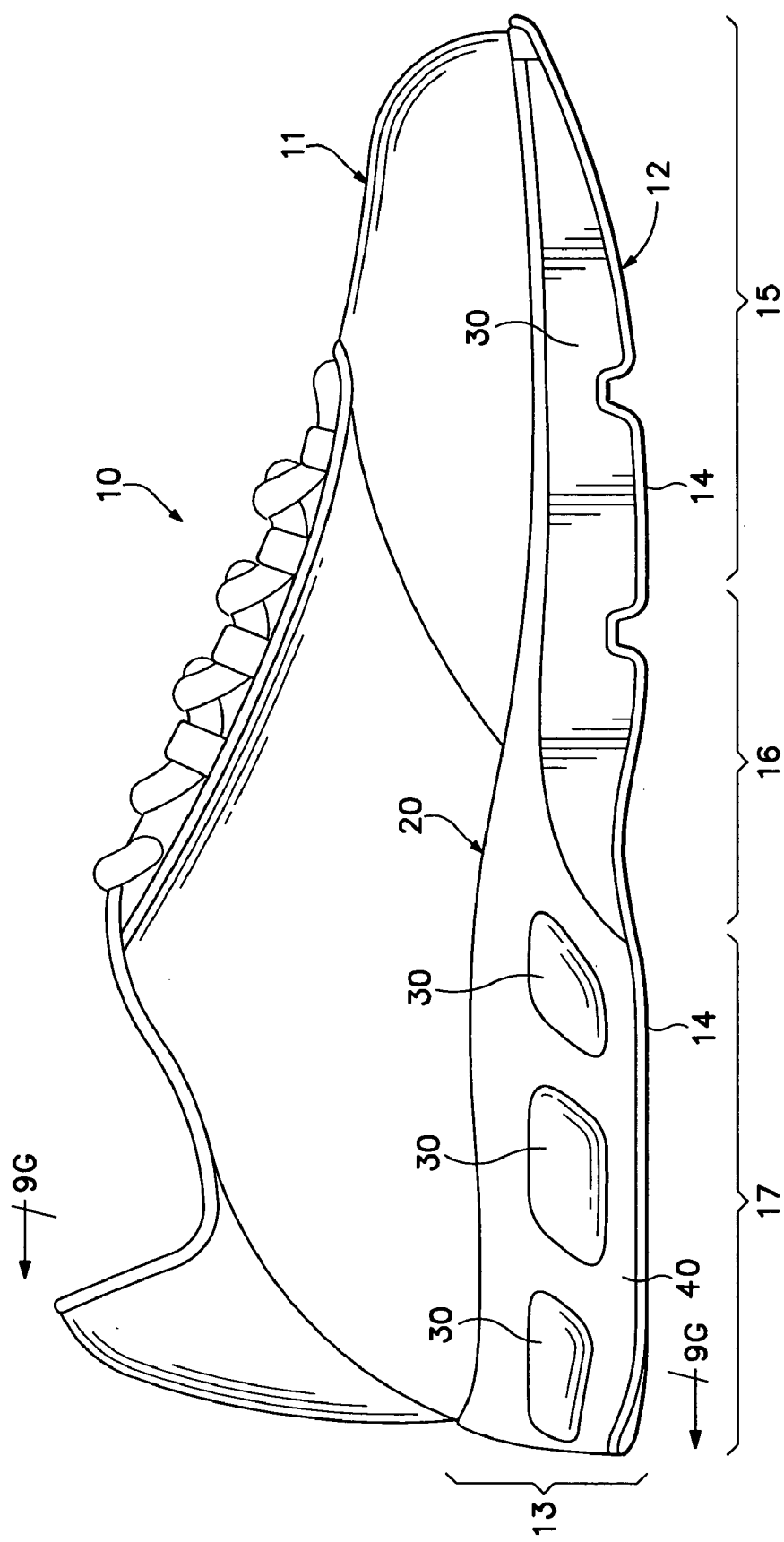
FIG. 1 is a lateral side elevational view of an article of footwear having a first sole component in accordance with the present invention.
Figure 2:
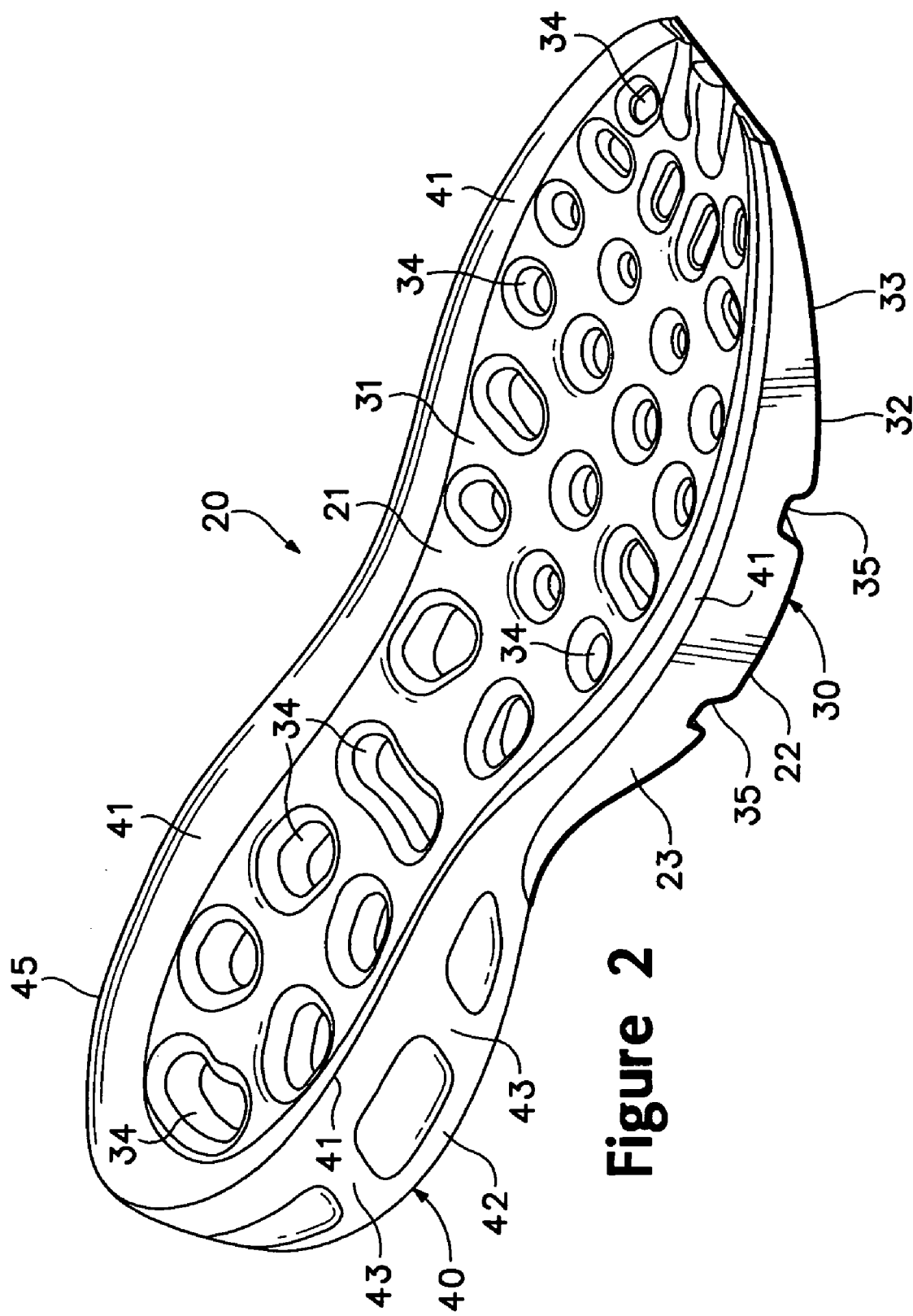
FIG. 2 is a first perspective view of the first sole component.
Figure 3:
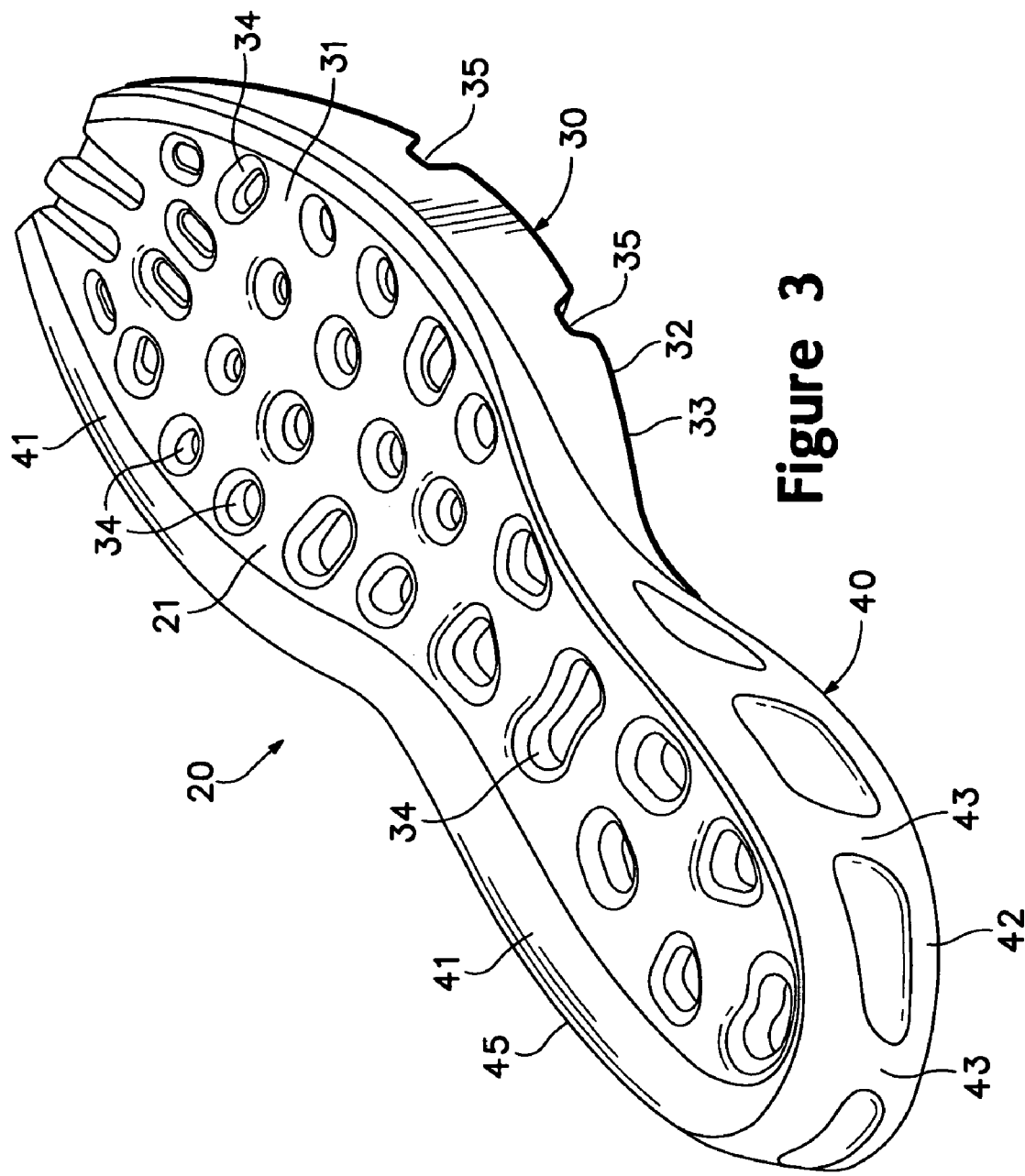
FIG. 3 is a second perspective view of the first sole component.
Figure 4:
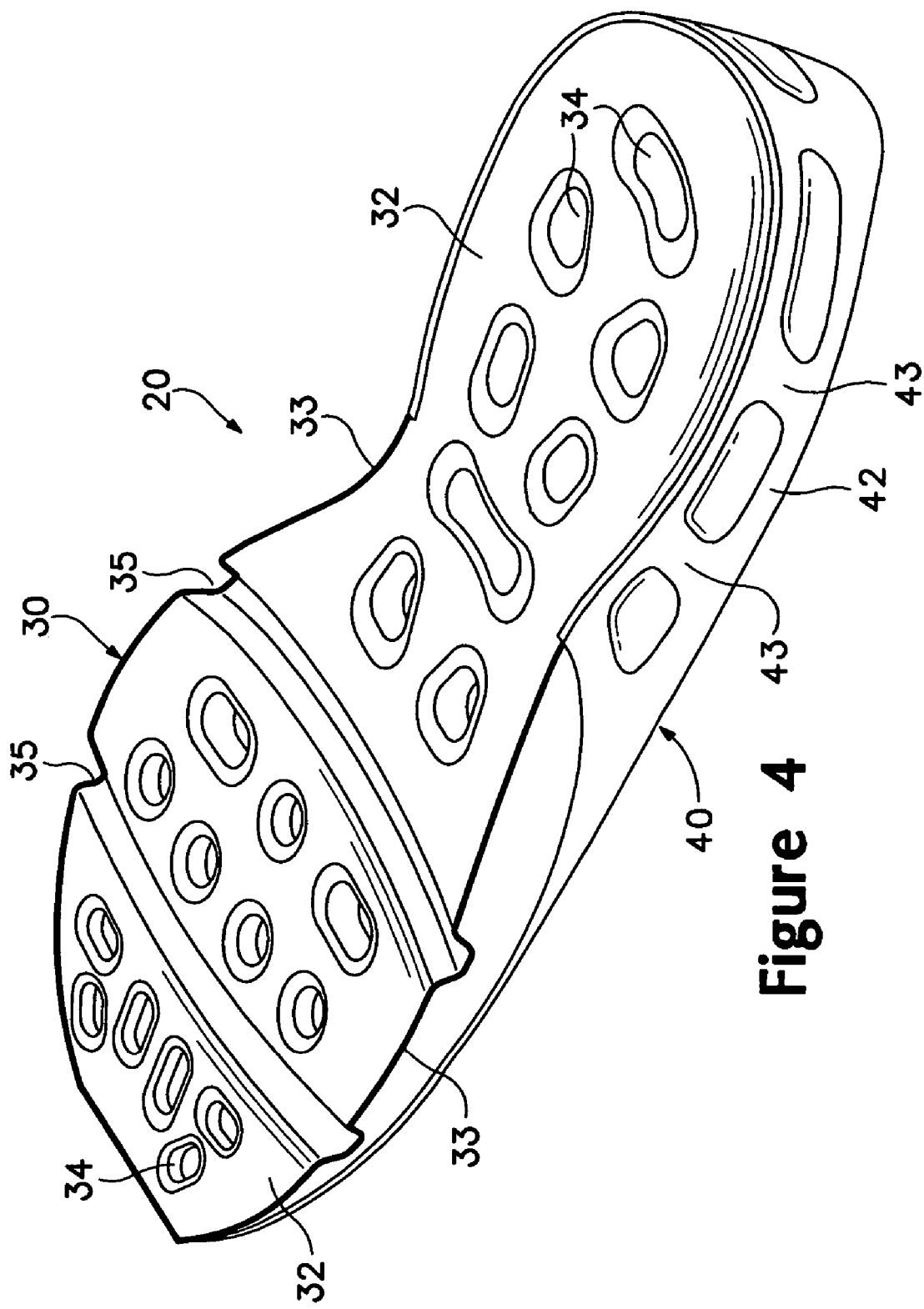
FIG. 4 is a third perspective view of the first sole component.

An article of footwear 10, as depicted in FIG. 1, includes an upper 11 and a sole structure 12. Upper 11 may incorporate a plurality material elements (e.g., textiles, foam, and leather) that are stitched or adhesively bonded together to form an interior void for securely and comfortably receiving a foot. The material elements may be selected and located with respect to upper 11 in order to selectively impart properties of durability, air-permeability, wear-resistance, flexibility, and comfort, for example. In addition, upper 11 may include a lace that is utilized in a conventional manner to modify the dimensions of the interior void, thereby securing the foot within the interior void and facilitating entry and removal of the foot from the interior void. The lace may extend through apertures in upper 11, and a tongue portion of upper 11 may extend between the interior void and the lace. Accordingly, upper 11 itself may have a substantially conventional configuration within the scope of the present invention.

Sole structure 12 is secured to upper 11 and includes a midsole 13 and an outsole 14. A conventional midsole is primarily formed of a polymer foam material, such as polyurethane or ethylvinylacetate, as discussed in the Background of the Invention section. In contrast with the structure of a conventional midsole, midsole 13 incorporates a sole component 20, as depicted in FIGS. 2–11, that includes a fluid-filled bladder 30 and an external reinforcing structure 40. Sole component 20 provides ground reaction force attenuation and energy absorption (i.e., cushioning) as footwear 10 impacts the ground during running, walking, or other ambulatory activities. In addition, sole component 20 may impart stability or otherwise control foot motions, such as the degree of pronation. Outsole 14 is secured to a lower surface of midsole 13 and is formed of a durable, wear-resistant material suitable for engaging the ground. Sole structure 12 may also include an insole 18 with the configuration of a thin cushioning member. Insole 18 may be positioned within the interior void formed by upper 11 and located to contact a plantar surface of the foot, thereby enhancing the overall comfort of footwear 10.

The following discussion references various general regions of footwear 10, upper 11, and sole structure 12 based upon their relative locations. For reference purposes, footwear 10 may be divided into three general regions: a forefoot region 15, a midfoot region 16, and a heel region 17, as depicted in FIG. 1. Forefoot region 15 generally includes portions of footwear 10 corresponding with the toes and the joints connecting the metatarsals with the phalanges. Midfoot region 16 generally includes portions of footwear 10 corresponding with the arch area of the foot, and heel region 17 corresponds with rear portions of the foot, including the calcaneus bone. Regions 15–17 are not intended to demarcate precise areas of footwear 10. Rather, regions 15–17 are intended to represent general areas of footwear 10 to aid in the following discussion. In addition to footwear 10, regions 15–17 may also be applied to upper 11, sole structure 12, and individual elements thereof.

Sole Component Structure

Sole component 20 includes an upper surface 21 and an opposite lower surface 22. Upper surface 21 is secured to upper 11 in a conventional manner, such as adhesive bonding, and may be contoured to conform with the shape of the plantar surface of the foot. Accordingly, upper surface 21 may exhibit an elevation in heel region 15 that is greater than an elevation in forefoot region 15, with midfoot region 16 forming a transition between the elevations. Differences in the overall thickness of sole component 20 account for the elevation in heel region 15 that is greater than the elevation in forefoot region 15. In general, the thickness of sole component 20 may range, for example, from 0.15 inches in the forward-most portion of forefoot region 15 to approximately 0.70 inches at the interface of forefoot region 15 and midfoot region 16. Similarly, the thickness of sole component 20 may range, for example, from 0.70 inches to approximately 1.20 inches in heel region 17.

Figure 5:
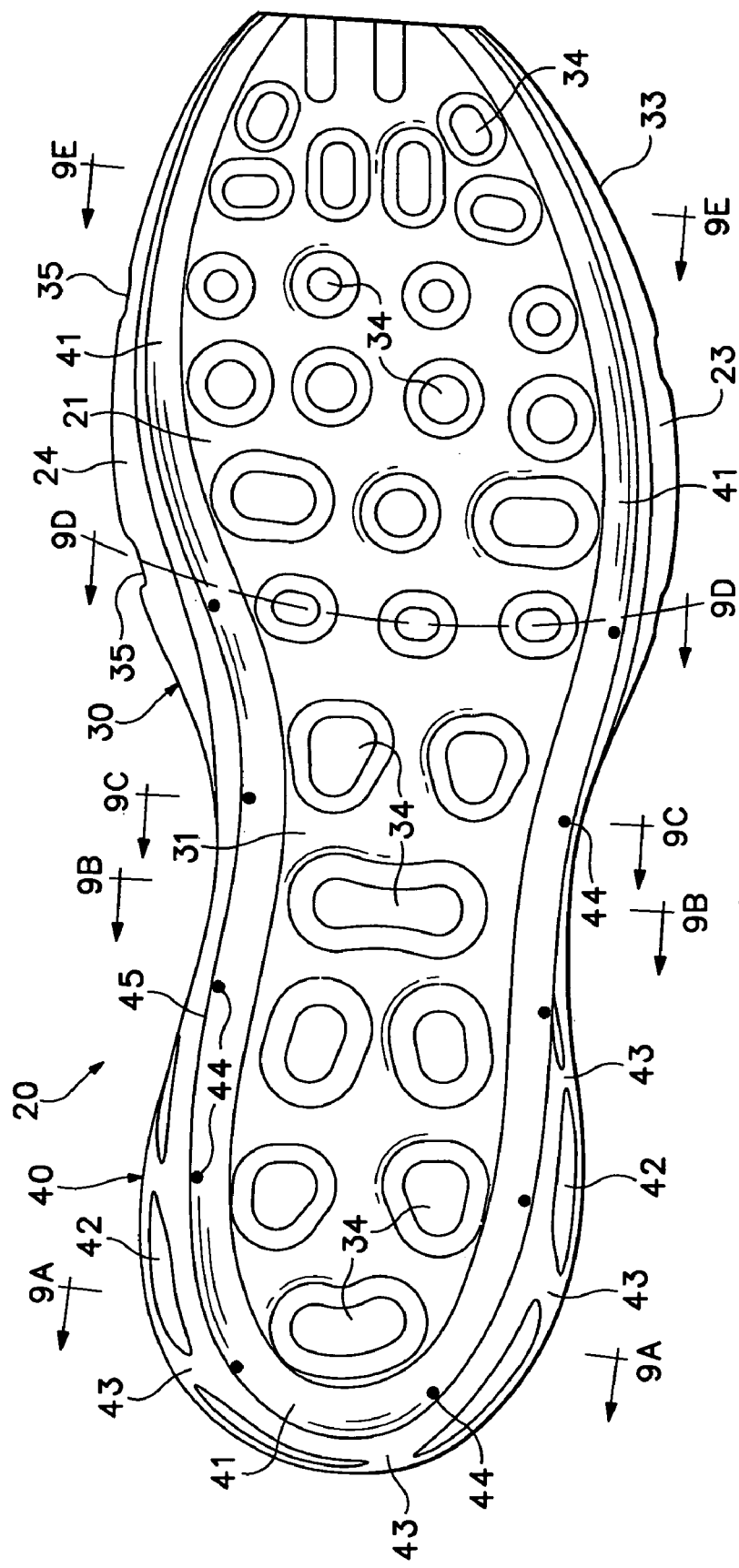
FIG. 5 is a top plan view of the first sole component.
Figure 6:
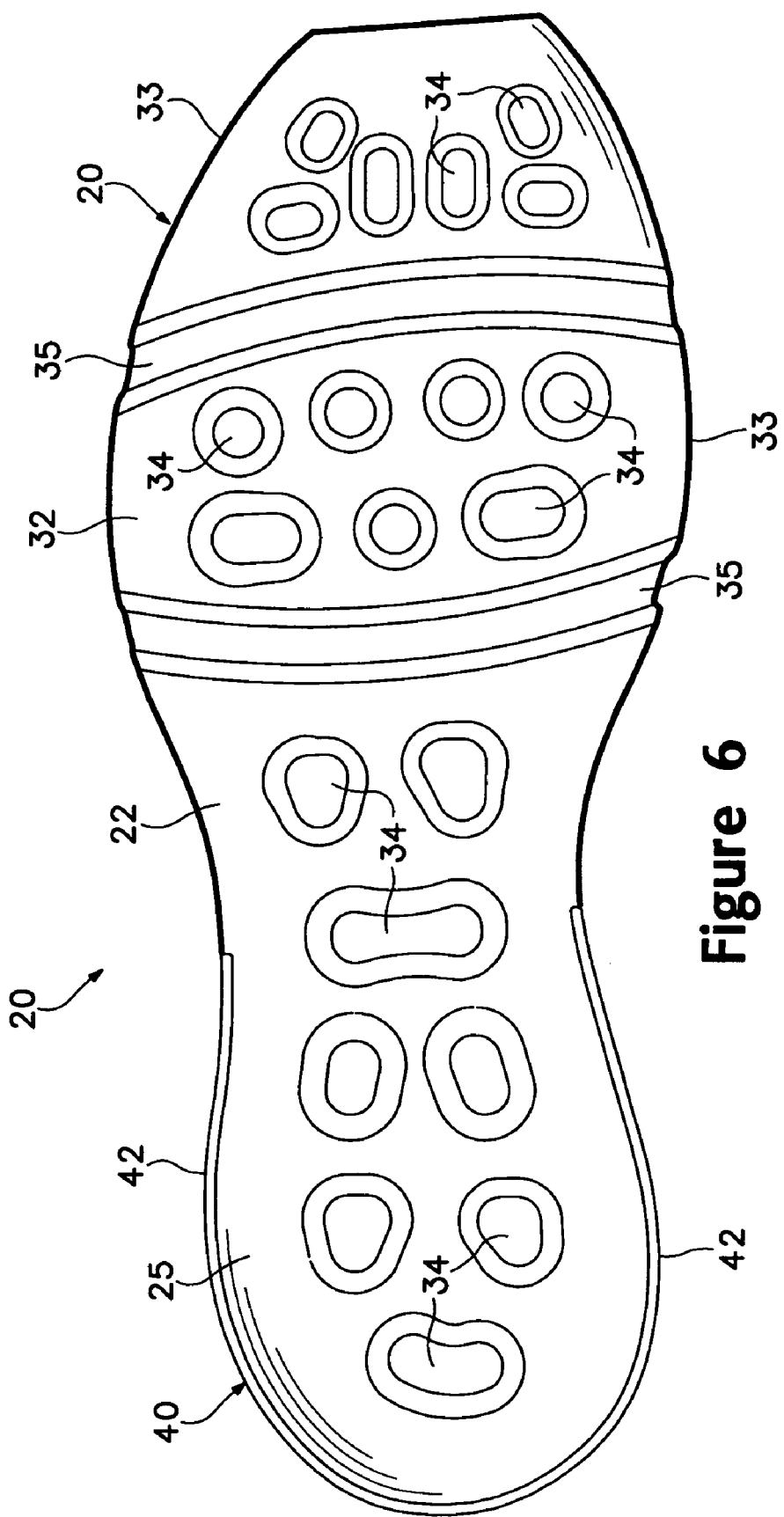
FIG. 6 is a bottom plan view of the first sole component.

The overall shape of sole component 20, as depicted in the plan view of FIGS. 5 and 6, corresponds with the shape of a foot. Accordingly, the width of heel region 17 may be less than a width of forefoot region 15 to accommodate the varying width dimensions of the foot. Outsole 14 is also secured to lower surface 22 in a conventional manner, such as adhesive bonding. In addition to upper surface 21 and lower surface 22, sole component 20 includes a lateral side surface 23 and an opposite medial side surface 24. Both side surfaces 23 and 24 are exposed portions of midsole 13 and have a tapered configuration from heel region 17 to forefoot region 15 that facilitates the difference in elevation between heel region 17 and forefoot region 15.

The primary elements of bladder 30 are a upper barrier layer 31 and a lower barrier layer 32 that are substantially impermeable to a pressurized fluid contained by bladder 30. Upper barrier layer 31 and lower barrier layer 32 are bonded together around their respective peripheries to form a peripheral bond 33 and cooperatively form a sealed chamber, in which the pressurized fluid is located. The pressurized fluid contained by bladder 30 induces an outward force upon barrier layers 31 and 32 that tends to separate or otherwise press outward upon barrier layers 31 and 32, thereby distending barrier layers 31 and 32. In order to restrict the degree of outwardly-directed swelling (i.e., distension) of barrier layers 31 and 32 due to the outward force of the pressurized fluid, a plurality of interior bonds 34 are formed between barrier layers 31 and 32. Interior bonds 34 are spaced inward from side surfaces 23 and 24, and interior bonds 34 are distributed throughout sole component 20. In the absence of interior bonds 34, the outward force induced by the pressurized fluid would impart a rounded or otherwise bulging configuration to bladder 30, particularly in areas corresponding with upper surface 21 and lower surface 22. Interior bonds 34, however, restrict the degree of the outwardly-directed swelling or distension of barrier layers 31 and 32 and retain the intended contours of upper surface 21 and lower surface 22.

Interior bonds 34 may exhibit a variety of configurations within the scope of the present invention. In heel region 17, the indentations formed by interior bonds 34 have a greater depth than in forefoot region 15 due to the increased overall thickness of sole component 20 in heel region 17. In addition, the area of each interior bond 34 in heel region 17 is generally greater than the area of each interior bond 34 in forefoot region 15. The position of interior bonds 34 with respect to upper surface 21 and lower surface 22 may also vary. For example, interior bonds 34 may be positioned so as to be closer to upper surface 21, midway between surfaces 21 and 22, or at a position that is closer to lower surface 22.

During running or walking, sole component 20 generally flexes or otherwise bends to accommodate the natural flexing of the foot, particularly in forefoot region 15. In order to facilitate the flexing of sole component 20, a pair of flexion indentations 35 are formed in bladder 30. Each flexion indentation 35 extends laterally across a lower portion of bladder 30. That is, flexion indentations 35 extend between side surfaces 23 and 24, and flexion indentations 35 are formed in lower surface 22. The location of flexion indentations 35 is also selected based upon the average location of the joints between the metatarsals and the proximal phalanges of the foot. More particularly, flexion indentations 35 are spaced such that one flexion indentation 35 is located forward of the joints between the metatarsals and the proximal phalanges and the other flexion indentation 35 is located behind the joints between the metatarsals and the proximal phalanges. The specific locations of flexion indentations 35 may be selected, for example, to be three standard deviations away from the average position of the joints between the metatarsals and the proximal phalanges, as determined through statistical anatomical data. Depending upon the specific configuration and intended use of sole component 20, however, the location of flexion indentations 35 may vary significantly from the positions discussed above.

Flexion indentations 35 extend laterally (i.e., between side surfaces 23 and 24) across lower surface 22. Although this configuration is suitable for footwear structured for running and a variety of other athletic activities, flexion indentations 35 may extend in a generally longitudinal direction (i.e., between forefoot region 15 and heel region 17) in footwear structured for athletic activities such as basketball, tennis, or cross-training. Accordingly, flexion indentations 35 may extend in a variety of directions in order to provide a defined line of flexion in sole component 20. The figures also depict flexion indentations 35 as extending entirely across bladder 30. In some embodiments, however, flexion indentations 35 may extend only partially across a portion of bladder 30.

Flexion indentations 35 define portions of sole component 20 that have a reduced thickness. Given that the degree of force necessary to bend an object is generally dependent upon the thickness of the object, the reduced thickness of sole component 20 in the areas of flexion indentations 35 facilitates flexing. In addition, portions of outsole 14 may extend into flexion indentations 35, thereby forming a stiffer, less compressible areas of sole structure 12 that also facilitate flexing about flexion indentations 35.

Figure 9A:
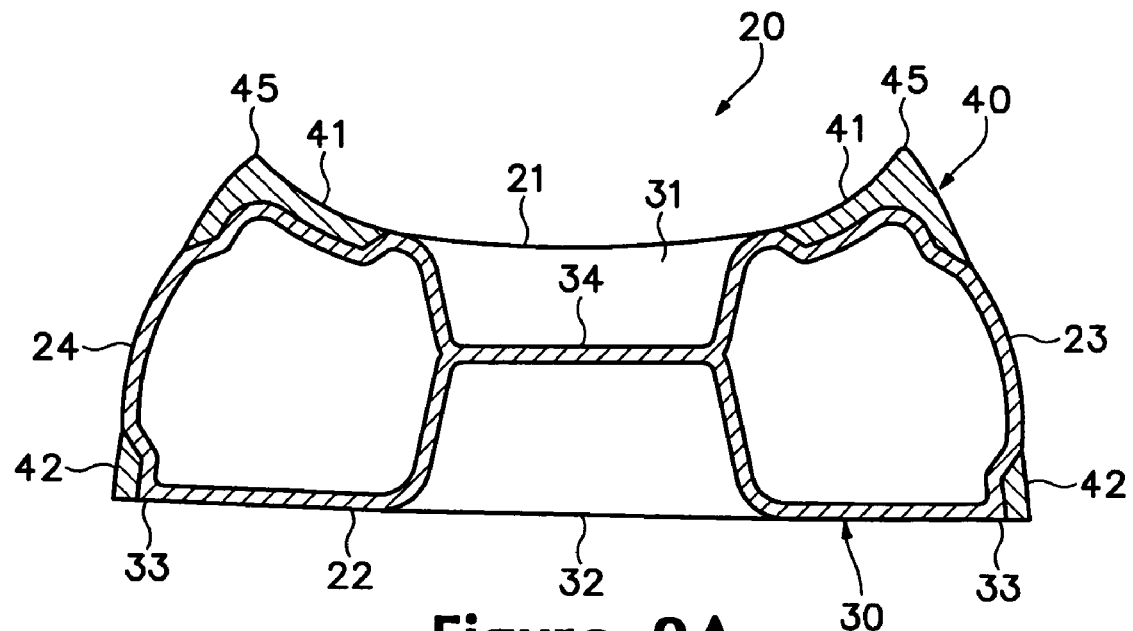
FIGS. 9A–9E are cross-sectional views of the first sole component, as defined by section lines 9A–9E in FIG. 5.
Figure 9B:
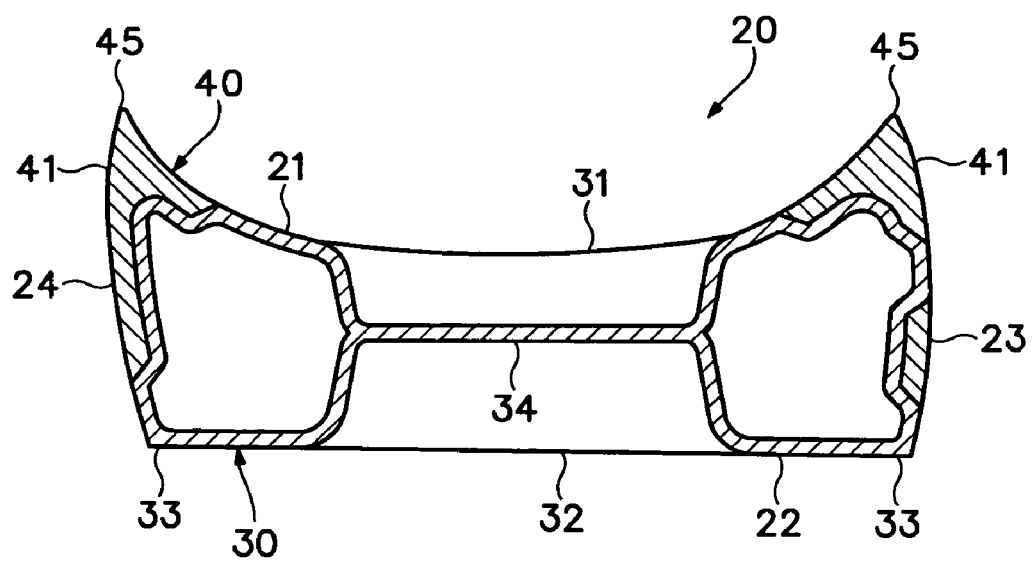
Figure 9C:
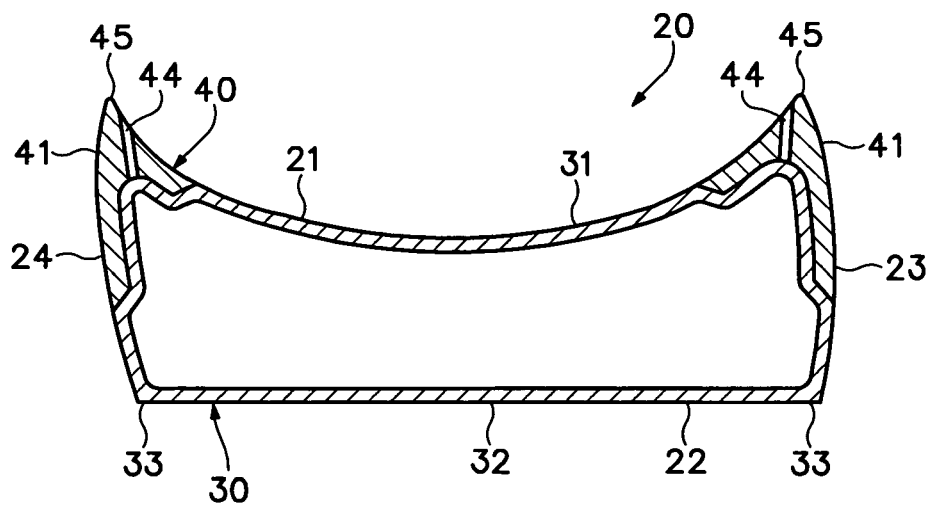
Figure 9D:
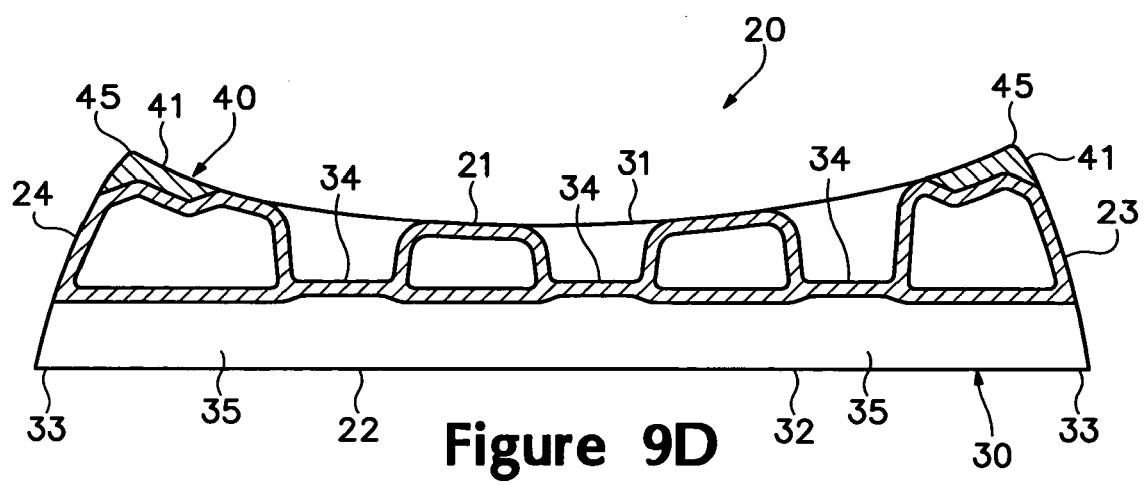
Figure 9E:
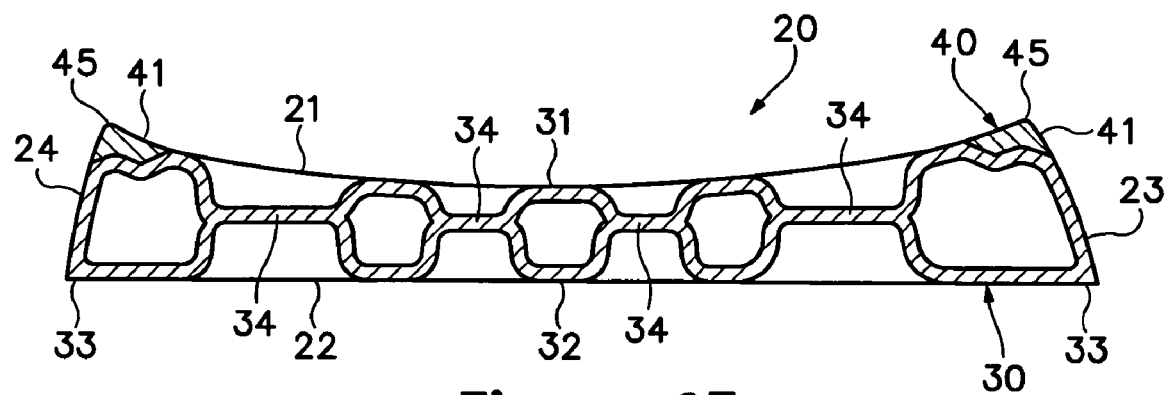

Flexion indentations 35 form an indentation in lower surface 22 that corresponds with the locations of various interior bonds 34. Referring to FIG. 9D, a cross-section through one of flexion indentations 35 is depicted. With respect to this area, interior bonds 34 extend downward to bond upper barrier layer 31 with the portion of lower barrier layer 32 that defines the flexion indentation 35. Some prior art bladders incorporate bonds that form flexion points, and the flexion points may form relatively hard areas due to the lack of a fluid cushion in the area of the flexion points. That is, the flexion points generally form non-cushioning areas of the prior art bladders. In contrast with the prior art flexion points, flexion indentations 35 form a fluid-filled portion of bladder 30 in areas between the connection of interior bonds 34 to flexion indentations 35. In other words, a space is formed between flexion indentations 35 and upper barrier layer 31 that includes the fluid such that flexion indentations 35 provide an advantage of simultaneously accommodating flexing and providing cushioning. As an alternative, no interior bonds 34 may be formed in areas that define flexion indentations 35.

A variety of thermoplastic polymer materials may be utilized for bladder 30, and particularly barrier layers 31 and 32, including polyurethane, polyester, polyester polyurethane, and polyether polyurethane. Another suitable material for bladder 30 is a film formed from alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Bladder 30 may also be formed from a flexible microlayer membrane that includes alternating layers of a gas barrier material and an elastomeric material, as disclosed in U.S. Pat. No. 6,082,025 and 6,127,026 to Bonk et al., both hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, hereby incorporated by reference. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

The fluid within bladder 30 may be any of the gasses disclosed in U.S. Pat. No. 4,340,626 to Rudy, hereby incorporated by reference, such as hexafluoroethane and sulfur hexafluoride, for example. The fluid may also include gasses such as pressurized octafluorapropane, nitrogen, or air. In addition to gasses, various gels or liquids may be sealed within bladder 30. Accordingly, a variety of fluids are suitable for bladder 30. With regard to pressure, a suitable fluid pressure is fifteen pounds per square inch, but may range from zero to thirty pounds per square inch. Accordingly, the fluid pressure within bladder 30 may be relatively high, or the fluid pressure may be at ambient pressure or at a pressure that is slightly elevated from ambient in some embodiments of the invention.

Reinforcing structure 40 forms a reinforcing cage that is bonded or otherwise secured to an exterior of bladder 30. In general, reinforcing structure 40 generally extends around portions of the periphery of bladder 30, and portions of reinforcing structure 40 extend along side surfaces 23 and 24 of sole component 20. Reinforcing structure 40 extends, therefore, between upper surface 21 and lower surface 22. In addition, the material forming reinforcing structure 40 exhibits a greater modulus of elasticity than the material forming bladder 30. Accordingly, the configuration and material properties of reinforcing structure 40 may impart reinforcement to sole component 20.

Interior bonds 34, as discussed above, are spaced inward from side surfaces 23 and 24 to restrict the degree of outwardly-directed swelling (i.e., distension) of barrier layers 31 and 32, particularly in areas corresponding with upper surface 21 and lower surface 22. Interior bonds 34 may not, however, significantly restrict the outwardly-directed swelling of side surfaces 23 and 24. One purpose of reinforcing structure 40 is, therefore, to restrict the degree of outwardly-directed swelling in side surfaces 23 and 24, thereby retaining the intended overall shape of sole component 20.

Reinforcing structure 40 includes an upper portion 41, a lower portion 42, and a plurality of connecting portions 43. Upper portion 41 exhibits a generally U-shaped configuration and is positioned at the interface of upper surface 21 and side surfaces 23 and 24. Accordingly, upper portion 41 extends along lateral side 23 from forefoot region 15 to heel region 17, extends around heel region 17, and also extends along medial side 24 from forefoot region 15 to heel region 17. Lower portion 42 also exhibits a generally U-shaped configuration and is positioned at the interface of lower surface 22 and side surfaces 23 and 24. Whereas upper portion 41 extends over portions of both upper surface 21 and side surfaces 23 and 24, lower portion 42 extends over side surfaces 23 and 24. That is, lower portion 42 covers areas of side surfaces 23 and 24 that are adjacent to lower surface 22, but lower portion 42 does not generally extend over lower surface 22. Lower portion 42 extends through heel region 17 and may extend into midfoot region 16. As depicted in the figures, however, lower portion 42 does not extend into forefoot region 15. Connecting portions 43 extend along side surfaces 23 and 24 and also extend between upper portion 41 and lower portion 42. Connecting portions 43 extend in a diagonal direction between upper portion 41 and lower portion 42. More particularly, connecting portions 43 exhibit a forwardly-inclined configuration, but may also be substantially vertical or rearwardly-inclined.

Upper portion 41, lower portion 42, and connecting portions 43 collectively form a plurality of apertures that expose portions of bladder 30. The apertures extend along side surfaces 23 and 24 in at least heel region 17, and the shape of the apertures generally depends upon the orientations of connecting portions 43 and the configurations of upper portion 41 and lower portion 42. The apertures formed through reinforcing structure 40 have a variety of shapes that include, for example, a parallelogram, oval, hexagon, triangle, circle, or various non-geometric shapes. The shape of the apertures may affect the compression characteristics of reinforcing structure 40 and may be selected, therefore, to provide particular properties to reinforcing structure 40.

Reinforcing structure 40 restricts the degree of outwardly-directed swelling in side surfaces 23 and 24, thereby retaining the intended overall shape of sole component 20. That is, the pressurized fluid within bladder 30 presses outward upon barrier layers 31 and 32, and reinforcing structure 40 restrains the distension in side surfaces 23 due to the fluid. Portions of reinforcing structure 40 are, therefore, placed in tension by the pressurized fluid. Although upper portion 41 and lower portion 42 may experience such tension, connecting portions 43, which extend along side surfaces 23 and 24, may generally experience greater degrees of tension. Accordingly, connecting portions 43 are placed in tension by the fluid pressure and operate to restrict the degree of outwardly-directed swelling or distension in side surfaces 23 and 24.

The specific configuration of reinforcing structure 40 discussed above is intended to provide an understanding of reinforcing structure 40 according to one embodiment of the invention, and as depicted in FIGS. 2–11. In further embodiments of the invention, however, the configuration of reinforcing structure 40 may be significantly modified. For example, upper portion 41 may be limited to heel region 17 and midfoot region 16, upper portion 41 may extend only over portions upper surface 21, or upper portion 41 may extend only over portions of side surface 23 and 24. Similarly, lower portion 42 may extend through each of regions 15–17, or lower portion 42 may extend over portions of lower surface 22. Connecting portions 43 may also exhibit a configuration that extends along side surfaces 23 and 24 in midfoot region 16 and forefoot region 15, and the numbers and dimensions of connecting portions 43 may vary significantly. Accordingly, reinforcing structure 40 may have a variety of configurations within the scope of the present invention.

Figure 9F:
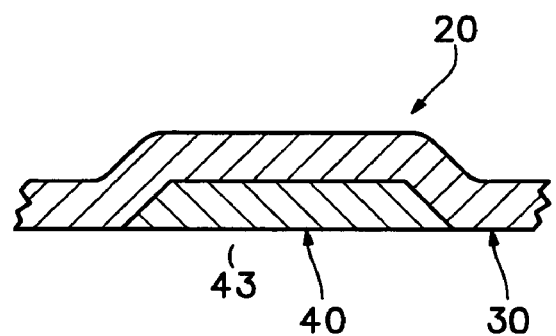
FIG. 9F is a cross-sectional view of the first sole component, as defined by section line 9F—9F in FIG. 7.

Reinforcing structure 40 is recessed into bladder 30 such that an outward-facing surface of reinforcing structure 40 is generally flush with surfaces 21–24 of bladder 30. Referring to FIG. 9F, a cross-sectional view through a portion of sole component 20 is depicted. The outward-facing surface of connecting portion 43, as depicted in the cross-sectional view, is generally flush with lateral side surface 23. Accordingly, lateral side surface 23 forms a recess that receives connecting portion 43. That is, lateral side surface 23 curves into bladder 30 so as to form a depression in which connecting portion 43 is positioned. In this manner, the various outward-facing surfaces of reinforcing structure 40 are generally flush with surfaces 21–24 of bladder 30. Forming the various outward-facing surfaces of reinforcing structure 40 to be generally flush with surfaces 21–24 of bladder 30 has an advantage of providing a smooth exterior configuration to sole component 20. In some embodiments of the invention, however, the outward-facing surfaces of reinforcing structure 40 may be inset or recessed into bladder 30 or may protrude outward beyond bladder 30.

Figure 10:
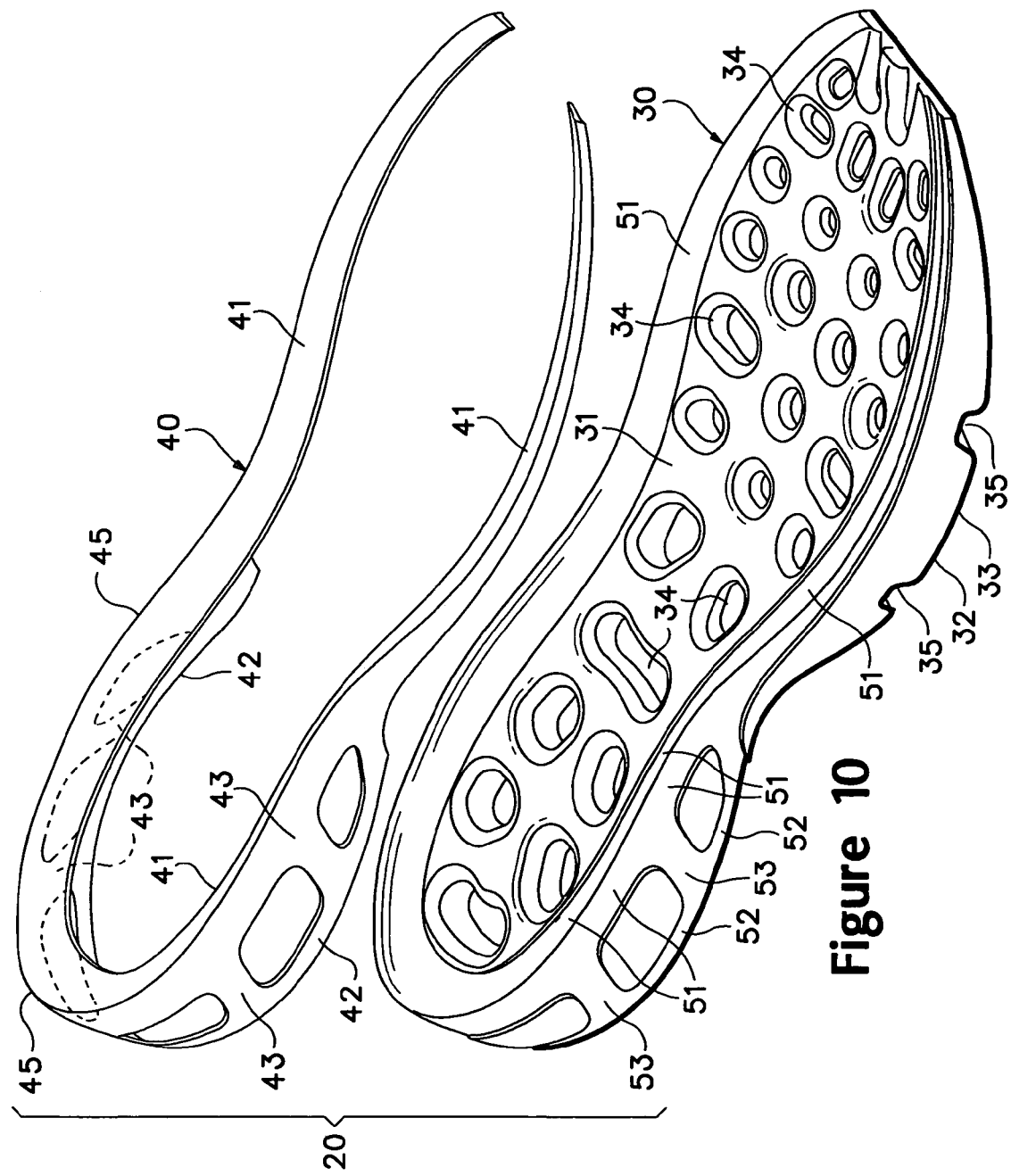
FIG. 10 is a first exploded perspective view of the first sole component.
Figure 11:
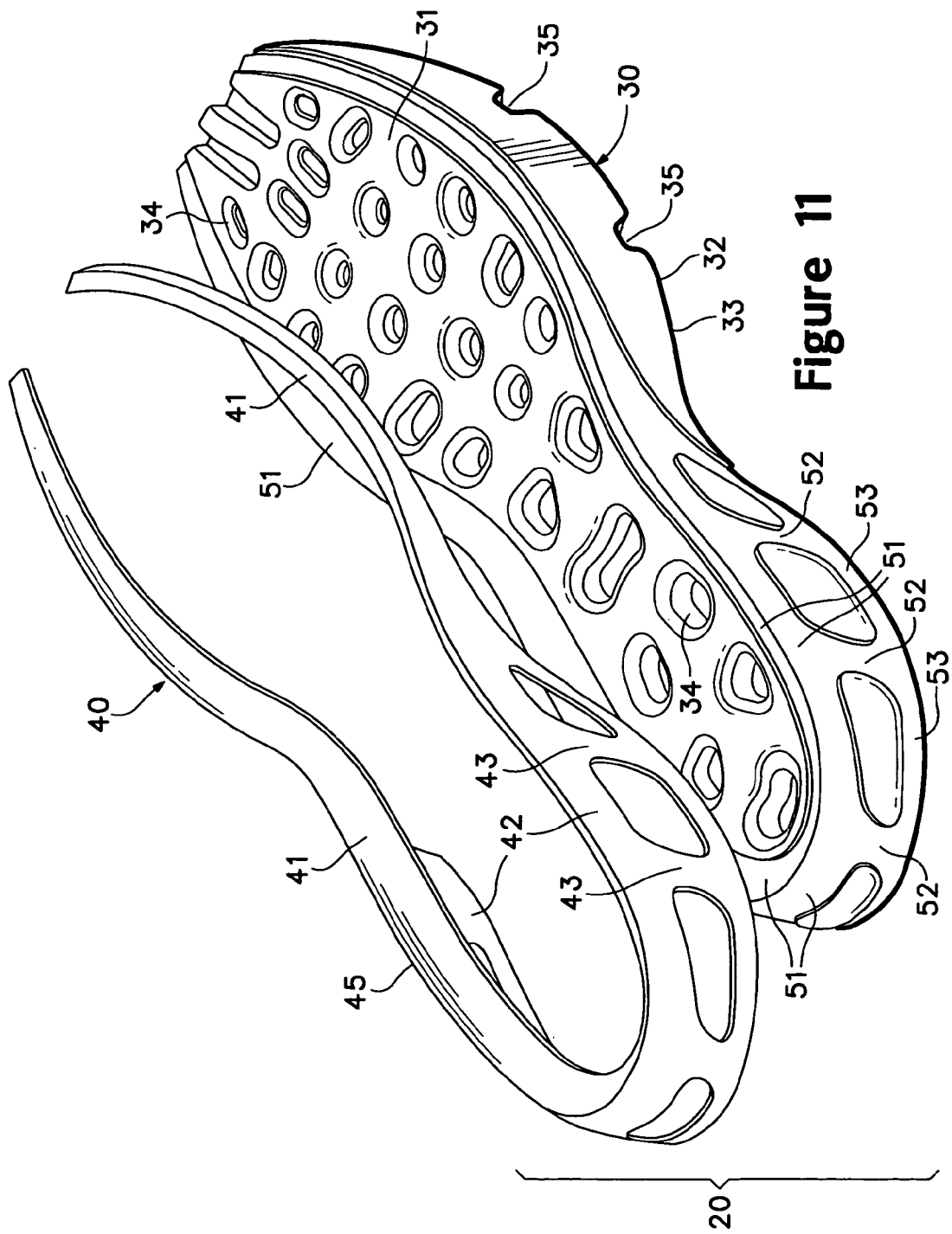
FIG. 11 is a second exploded perspective view of the first sole component.

The various recesses that receive reinforcing structure 40 are depicted in the exploded view of FIG. 10. More particularly, bladder 30 defines a first recess 51, a second recess 52, and a plurality of third recesses 53. First recess 51 corresponds with the location of upper portion 41 and extends, therefore, around the perimeter of upper surface 21. Portions of first recess 51 also extend along side surfaces 23 and 24 at the interface of upper surface 21 and side surfaces 23 and 24. Second recess 52 corresponds with the location of lower portion 42 and is, therefore, positioned adjacent to peripheral bond 33 in heel region 17 and portions of midfoot region 16. In addition, the plurality of third recesses 51 extend between first recess 51 and second recess 52 to correspond with the locations of connecting portions 43.

An injection-molding process or compression-molding process, for example, may be utilized to form reinforcing structure 40 from a diverse range of materials. Suitable materials for reinforcing structure 40 include polyester, thermoset urethane, thermoplastic urethane, various nylon formulations, blends of these materials, or blends that include glass fibers. In addition, reinforcing structure 40 may be formed from a high flex modulus polyether block amide, such as PEBAX, which is manufactured by the Atofina Company. Polyether block amide provides a variety of characteristics that benefit the present invention, including high impact resistance at low temperatures, few property variations in the temperature range of minus 40 degrees Celsius to positive 80 degrees Celsius, resistance to degradation by a variety of chemicals, and low hysteresis during alternative flexure. Another suitable material for reinforcing structure 40 is a polybutylene terephthalate, such as HYTREL, which is manufactured by E.I. duPont de Nemours and Company. Composite materials may also be formed by incorporating glass fibers or carbon fibers into the polymer materials discussed above in order to enhance the strength of reinforcing structure 40. As discussed above, the material forming reinforcing structure 40 exhibits a greater modulus of elasticity than the material forming bladder 30. Whereas the material forming bladder 30 is generally flexible, the material forming reinforcing structure 40 may exhibit semi-rigid or rigid properties.

Although reinforcing structure 40 may be formed from a single material, two or more materials may be incorporated into reinforcing structure 40 in some embodiments of the invention. For example, upper portion 41 may be formed from a material that exhibits lesser stiffness than a material forming lower portion 42 and connecting portions 43. This configuration provides a softer material adjacent to upper 11, which may enhance the comfort of footwear 10 and promote bonding between sole structure 12 and upper 11. Portions of reinforcing structure 40 corresponding with lateral side surface 23 may also be formed with lesser stiffness than the portions of reinforcing structure 40 corresponding with medial side surface 24. In addition, some embodiments may vary the materials throughout reinforcing structure 40 in order to provide specific compression, stability, and flexibility properties to particular portions of reinforcing structure 40.

Sole component 20, as described above, provides ground reaction force attenuation and energy absorption (i.e., cushioning) as footwear 10 impacts the ground during running, walking, or other ambulatory activities. In addition, sole component 20 may impart stability or otherwise control foot motions, such as the degree of pronation. The degree of cushioning provided by sole component 20, and the manner in which sole component 20 controls foot motions, are primarily determined by the configuration of both bladder 30 and reinforcing structure 40 and the properties of the materials forming bladder 30 and reinforcing structure 40. Accordingly, variations in the configuration of both bladder 30 and reinforcing structure 40, and the materials utilized therein, may be employed to tune or otherwise control the cushioning and motion control properties of sole structure 12. The manner in which sole component 20 may be configured to control the cushioning and motion control properties of footwear 10 will be discussed in greater detail in the following material.

Lower surface 22 forms an upwardly-beveled area 25 in a rear-lateral portion of sole component 20 in order to permit the footwear to smoothly roll both forward and to the medial side following heel strike. As depicted in FIGS. 1, 6, and 7, the vertical thicknesses of the portions of bladder 30 and reinforcing structure 40 forming lateral side surface 23 decrease in rear portions of heel region 17. The rationale for the decreased thickness, which forms beveled area 25, corresponds with the typical motion of the foot during running, which proceeds as follows: Initially, the heel strikes the ground, followed by the ball of the foot. As the heel leaves the ground, the foot rolls forward so that the toes make contact, and finally the entire foot leaves the ground to begin another cycle. During the time that the foot is in contact with the ground and rolling forward, it also rolls from the outside or lateral side to the inside or medial side, a process called pronation. While the foot is air-borne and preparing for another cycle, the opposite process, called supination, occurs.

An advantage of beveled area 25 is to permit footwear 10 to smoothly transition from the position at heel strike, wherein only the rear-lateral portion of sole structure 12 is in contact with the ground, to the position where a substantial portion of outsole 14 is in contact with the ground. That is, beveled area 25 permits footwear 10 to smoothly roll both forward and to the medial side following heel strike. As with bladder 30, the thickness of reinforcing structure 40 is also reduced to form beveled area 25. Furthermore, the positions of connecting portions 43 are selected such that a space is formed between two adjacent connecting portions 43 at the location of beveled area 25. The space between adjacent connecting portions 43 further facilitates a smooth transition from the position at heel strike by providing greater compressibility to sole component 20 at the position of beveled area 25.

The compressibility of specific areas of sole component 20 affects the cushioning and motion control properties of sole component 20. In general, forming sole component 20 such that peripheral areas (i.e., the areas adjacent to side surfaces 23 and 24) are less compressible than interior areas enhances the stability of sole component 20. One manner in which peripheral compressibility is decreased in sole component 20 is through reinforcing structure 40. The position of reinforcing structure 40 around the periphery of sole component 20, coupled with the semi-rigid, less flexible properties of the material forming reinforcing structure 40, operates to decrease the compressibility of the periphery, thereby enhancing stability.

The distribution and configurations of the various interior bonds 34 also affects the compressibility and flexibility of sole component 20. In general, interior bonds 34 are spaced inward from side surfaces 23 and 24, and interior bonds 34 are spaced from each other. Interior bonds 34 form indentations in bladder 30. Whereas surfaces 21 and 22 are generally horizontal, the material forming barrier layers 31 and 32 extend in a generally vertical direction to form the indentations of interior bonds 34. During compression of sole component 20, the vertically-extending material forming interior bonds 34 also compresses, bends, or otherwise deforms, thereby decreasing the compressibility of sole component 20 in areas immediately adjacent to interior bonds 34. That is, the presence of an interior bond 34 decreases the compressibility of sole component 20 in the area immediately adjacent to the interior bond 34.

Pronation, which is the rolling of the foot from the outside or lateral side to the inside or medial side, is a natural motion of the foot during running. Some individuals, however, pronate to a degree that is generally considered to be undesirable and sole component 20 may be configured, therefore, to limit the degree of pronation. As discussed above, interior bonds 34 decrease the compressibility of sole component 20 in specific areas. By positioning a greater number, for example, of interior bonds 34 on the medial side of sole component 20, the compressibility of the medial side may be decreased. As the foot rolls from the lateral side to the medial side, the increased compressibility may operate to limit the degree of pronation in the foot. Accordingly, the distribution of interior bonds 34 may be selected to control foot motions, such as pronation.

The cushioning and motion control properties of sole component 20 may also be affected by the configuration of reinforcing structure 40. The dimensions of upper portion 41, lower portion 42, and connecting portions 43 may be selected to provide specific degrees of flexibility and compressibility to portions of reinforcing structure 40. For example, the compressibility of peripheral areas of sole component 20 may be selected through modifications in the overall thickness of upper portion 41. Similarly, the compressibility of heel region 17 may be selected through modifications in the dimensions or number of connecting portions 43. The thickness of reinforcing structure 40 may also be tapered between upper portion 41 and lower portion 42 in order to control the compressibility of reinforcing structure 40 or limit the degree to which reinforcing structure creases or buckles during compression. In addition, a central area of connecting portions 43 may be thicker than upper or lower portions in order to impart a specific compressibility, for example. In some embodiments of the invention, reinforcing structure 40 may be formed from two or more materials. As discussed above, structuring sole component 20 to exhibit lesser medial compressibility may reduce the degree of pronation in the foot. Accordingly, the material selected for a lateral side of reinforcing structure 40 may have a lesser modulus of elasticity than the material selected for a medial side of reinforcing structure 40, thereby decreasing the compressibility of the medial side.

Manufacturing Process

One suitable manufacturing process for sole component 20 utilizes a mold 100, as depicted in FIGS. 12A–13B. Mold 100 includes an upper mold portion 110 and a corresponding lower mold portion 120. When joined together, mold portions 110 and 120 form a cavity having dimensions substantially equal to the exterior dimensions of sole component 20. Mold 100 may be utilized for thermoforming bladder 30 and simultaneously bonding or otherwise securing reinforcing structure 40 to the exterior of bladder 30. In general, reinforcing structure 40 is placed within upper mold portion 110 and two thermoplastic polymer sheets are placed between mold portions 110 and 120. The thermoplastic sheets are then drawn into the contours of mold 100 such that at least one of the thermoplastic sheets contacts and is bonded to reinforcing structure 40. In addition, mold portions 110 and 120 compress the thermoplastic sheets together to form peripheral bond 33. Once the thermoplastic sheets have conformed to the shape of bladder 30, reinforcing structure 40 is bonded to the thermoplastic sheets, peripheral bond 33 is formed, and bladder 30 may be pressurized with a fluid and sealed, thereby forming sole component 20.

Figure 12A:
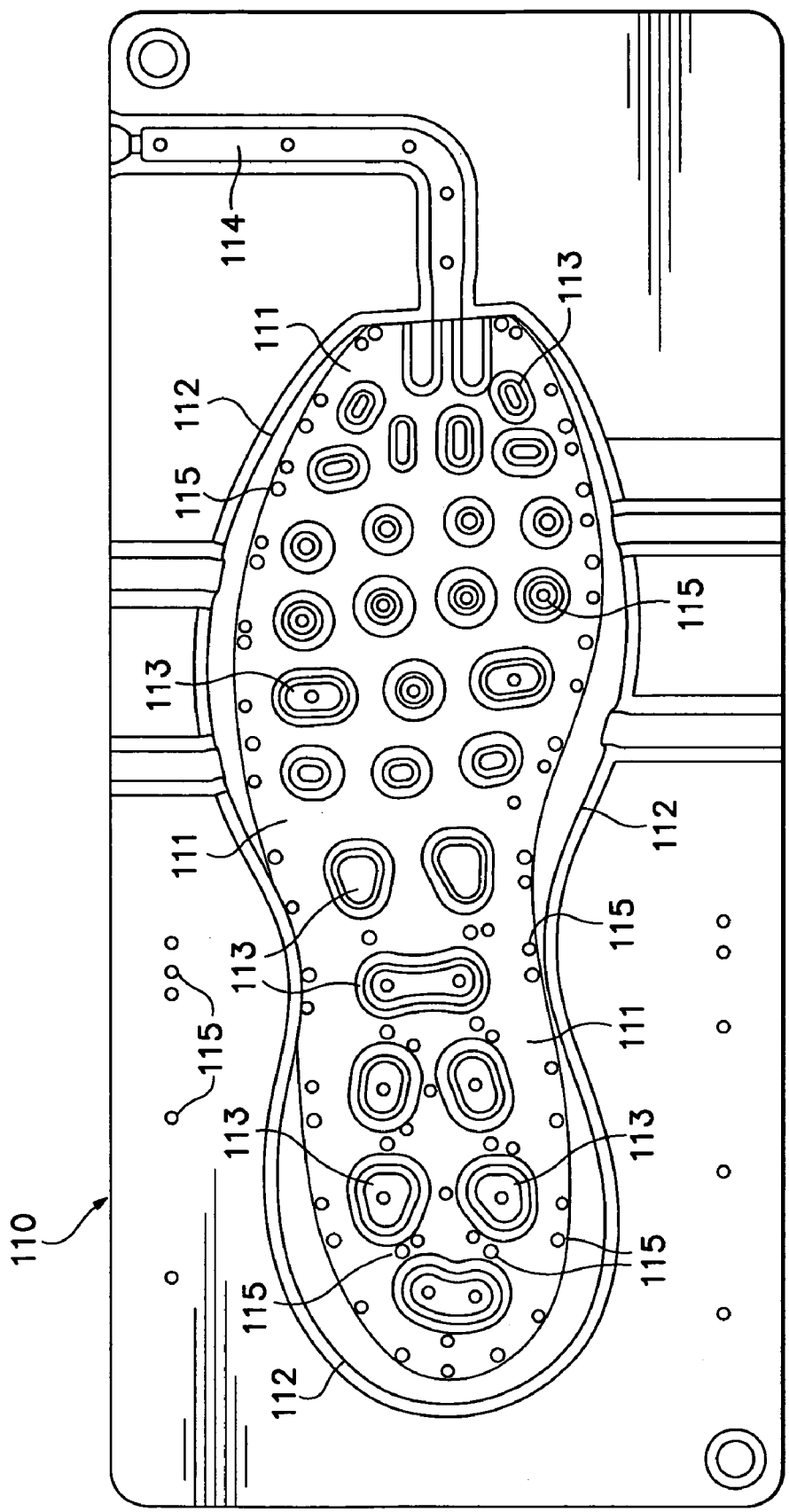
FIG. 12A is a top plan view of an upper mold portion of a mold for forming the first sole component.
Figure 12B:
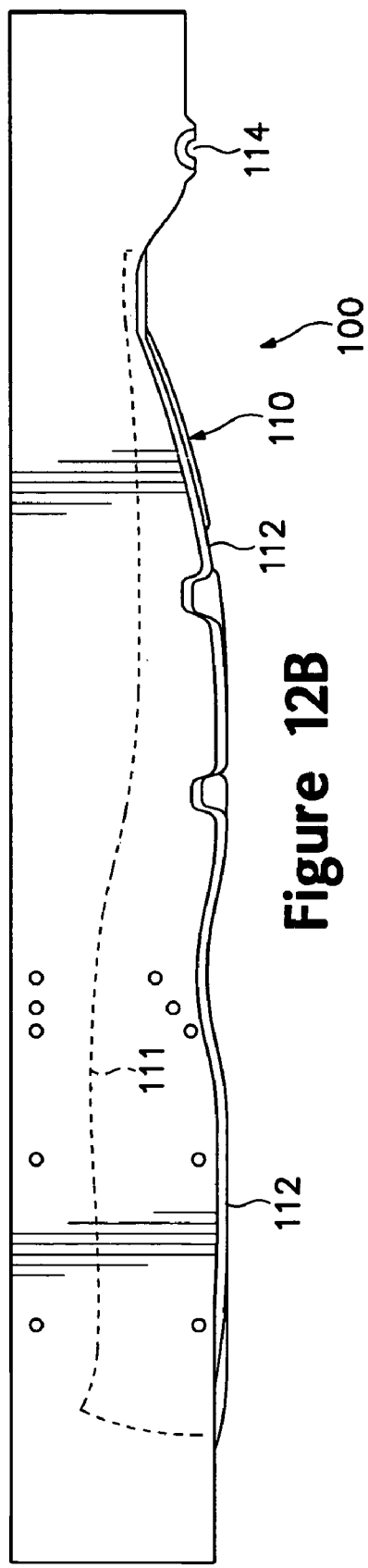
FIG. 12B is a side elevational view of the upper mold portion.

Upper mold portion 110 is depicted individually in FIGS. 12A and 12B and includes a cavity 111 that forms the portions of sole component 20 corresponding with upper surface 21 and side surfaces 23 and 24. A ridge 112 extends around cavity 111 and is partially responsible for forming peripheral bond 33. In addition, a plurality of protrusions 113 extend from a surface of cavity 111 and are partially responsible for forming interior bonds 34. Accordingly, the area of upper mold portion 110 located within the area bounded by ridge 112 forms upper surface 21 and side surfaces 23 and 24. An extension of ridge 112 extends outward from cavity 111 and forms an L-shaped channel 114. As discussed in greater detail below, channel 114 is utilized to form a conduit through which a fluid may be injected into sole component 20. Another feature of upper mold portion 110 is a plurality of slot vents 115 distributed throughout cavity 111. Vents 115 provide outlets for air as a thermoplastic sheet of polymer material is drawn into the contours of upper mold portion 110 during the formation of sole component 20.

Figure 13B:
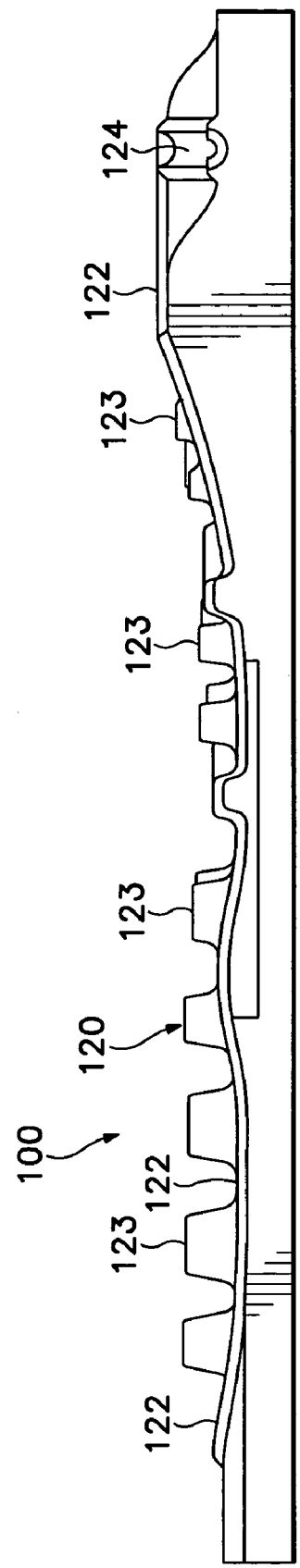
FIG. 13B is a side elevational view of the lower mold portion.
Figure 13A:
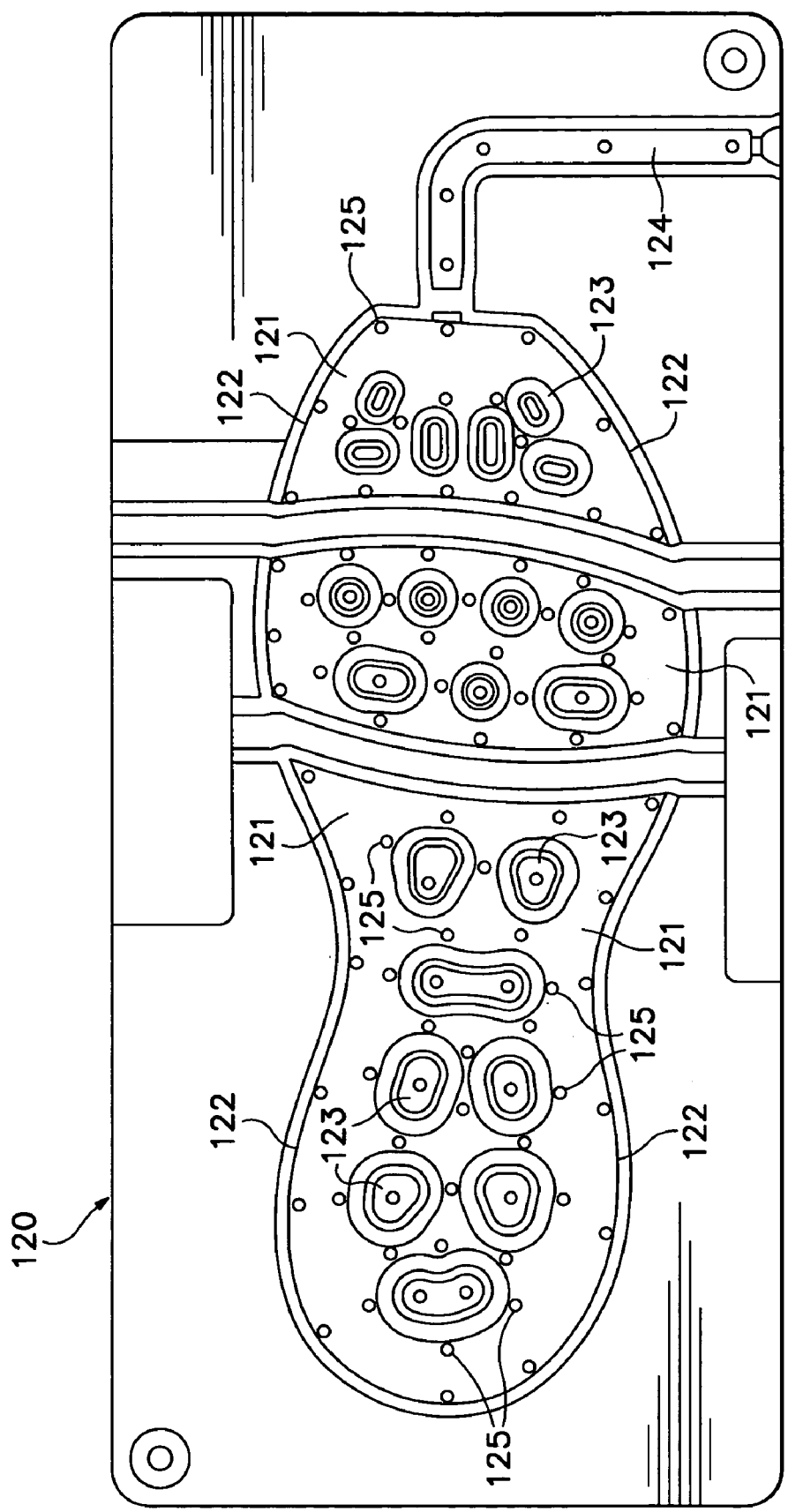
FIG. 13A is a top plan view of a lower mold portion of the mold.

Lower mold portion 120 is depicted individually in FIGS. 13A and 13B and includes a surface 121 that forms the portion of sole component 20 corresponding with lower surface 22. A ridge 122 extends around surface 121 and, in combination with ridge 112, is responsible for forming peripheral bond 33. In addition, a plurality of protrusions 123 extend from surface 121 and join with protrusions 113 to form interior bonds 34. Accordingly, the area of lower mold portion 120 located within the area bounded by ridge 122 forms lower surface 22. An extension of ridge 122 extends outward from surface 121 and forms an L-shaped channel 124. Channel 124 joins with channel 114 to form the conduit through which the fluid may be injected into sole component 20. Another feature of lower mold portion 120 is a plurality of slot vents 125 distributed throughout surface 121. Vents 125 provide outlets for air as a thermoplastic sheet of polymer material is drawn into the contours of lower mold portion 120 during the formation of sole component 20.

The manner in which mold 100 is utilized to form sole component 20 from reinforcing structure 40 and barrier layers 31 and 32 will now be discussed. An injection-molding process, for example, may be utilized to form reinforcing structure 40 from the materials discussed above. Reinforcing structure 40 is then cleansed with a detergent or alcohol, for example, in order to remove surface impurities, such as a mold release agent or fingerprints. The surface of reinforcing structure 40 may also be plasma treated to enhance bonding with bladder 30.

Figure 14A:
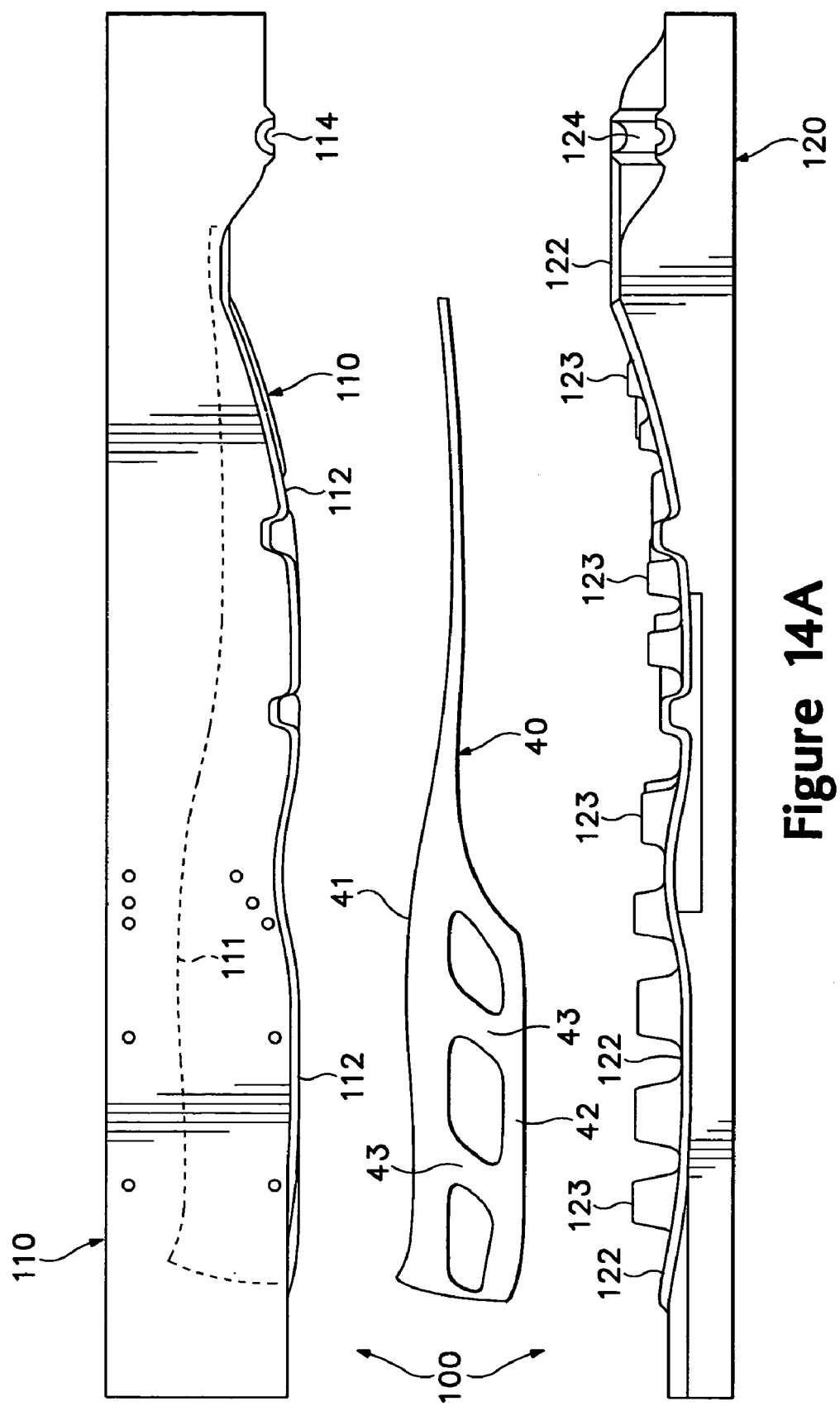
FIGS. 14A–14E depict various manufacturing steps in forming the first sole component.
Figure 14B:
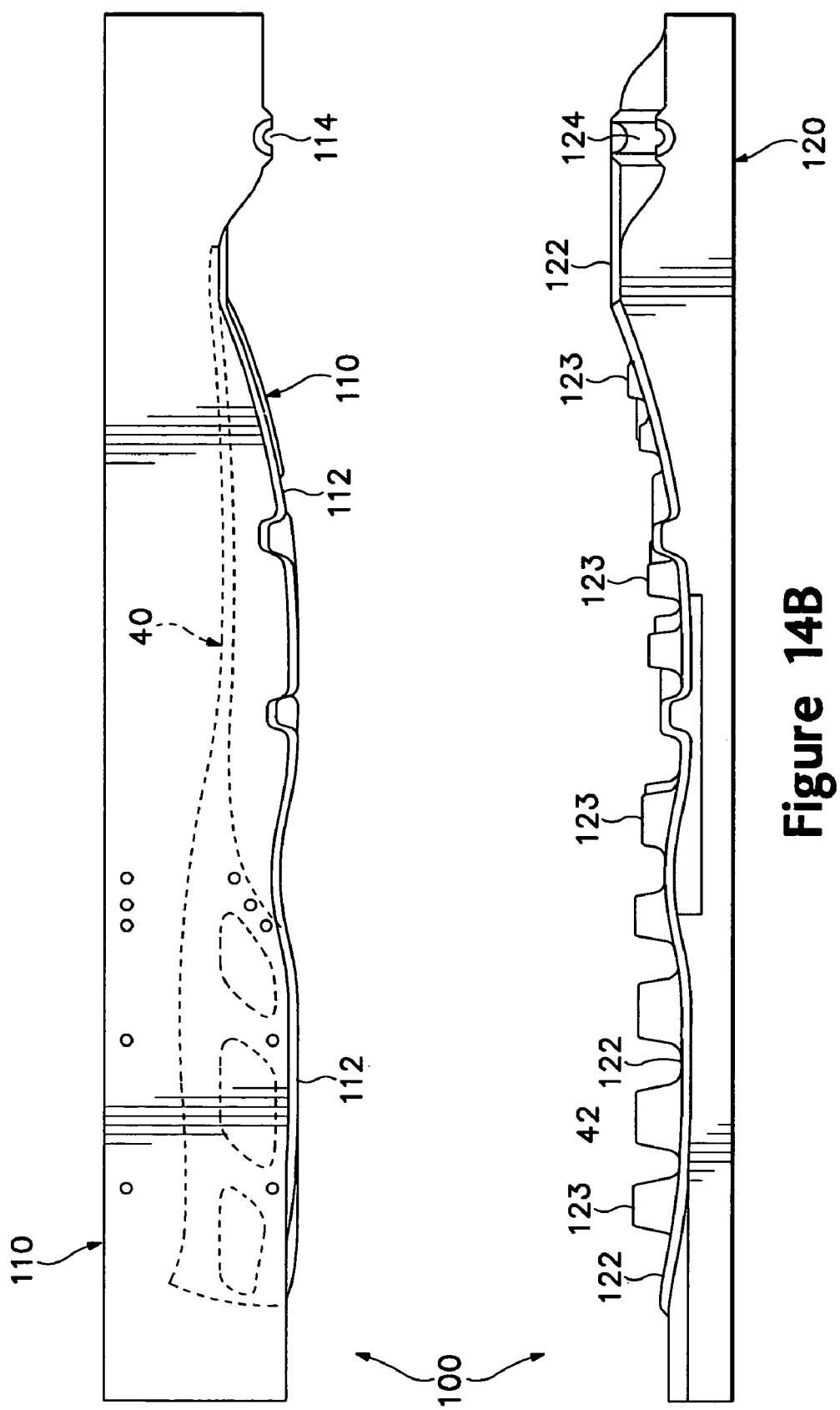

Following formation and cleansing, reinforcing structure 40 is placed between mold portions 110 and 120 and then positioned within upper mold portion 110, as depicted in FIGS. 14A and 14B, respectively. As discussed in the above material, upper mold portion 110 forms the portions of sole component 20 corresponding with upper surface 21 and side surfaces 23 and 24. In the embodiment of sole component 20 discussed above, reinforcing structure 40 is generally bonded to upper surface 21 and side surfaces 23 and 24. Accordingly, positioning reinforcing structure 40 within upper mold portion 110, as depicted in FIG. 14B, properly positions reinforcing structure 40 with respect to mold 100 for the process of forming sole component 20. A variety of techniques may be utilized to secure reinforcing structure 40 within upper mold portion 110, including a vacuum system, various seals, or non-permanent adhesive elements, for example. In addition, reinforcing structure 40 may include various tabs that define apertures, and upper mold portion 110 may include protrusion that engage the apertures to secure reinforcing structure 40 within upper mold portion 110.

A plurality of conduits may extend through mold 100 in order to channel a heated liquid, such as water, through mold 100. The heated liquid raises the overall temperature of mold 100 to approximately 180 degrees Fahrenheit. As noted above, reinforcing structure 40 is positioned within mold 100, and reinforcing structure 40 conducts the heat from mold 100, thereby raising the temperature of reinforcing structure 40 to approximately 180 degrees Fahrenheit. In some embodiments of the invention, reinforcing structure 40 may be heated prior to placement within mold 100 in order to decrease manufacturing times.

Figure 14C:
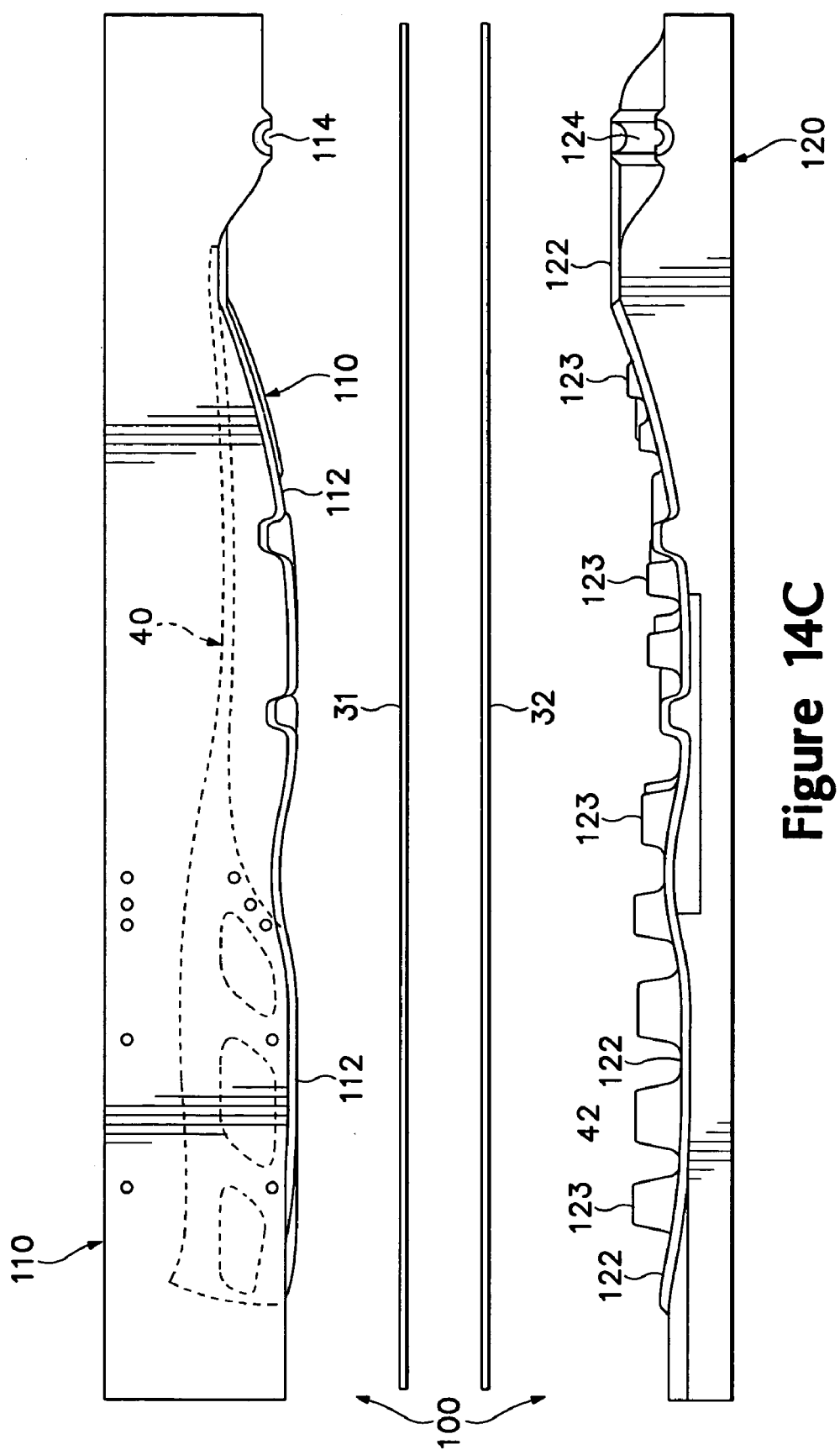

Following placement of reinforcing structure 40 within upper mold portion 110, a pair of thermoplastic polymer sheets that form barrier layers 31 and 32 are heated and then positioned between mold portions 110 and 120, as depicted in FIG. 14C. The temperature to which barrier layers 31 and 32 are heated depends upon the specific material used. As noted above, barrier layers 31 and 32 may be formed from a variety of materials, including alternating layers of thermoplastic polyurethane and ethylene-vinyl alcohol copolymer, which has a melting temperature between 350 and 360 degrees Fahrenheit. The temperature to which the surfaces of barrier layers 31 and 32 may be heated is between 400 and 450 degrees Fahrenheit, which generally melts the surface of barrier layers 31 and 32 without melting the interior.

The thickness of upper barrier layer 31 prior to molding may be greater than the thickness of lower barrier layer 32. Although barrier layers 31 and 32 may exhibit different thicknesses prior to molding, each of barrier layers 31 and 32 may have a substantially uniform thickness prior to molding. A suitable thickness range for upper barrier layer 31 prior to molding is 0.045 to 0.090 inches, with one preferred thickness being 0.075 inches, and a suitable thickness range for lower barrier layer 32 prior to molding is 0.045 to 0.065 inches, with one preferred thickness being 0.055 inches. Whereas lower barrier layer 32 only forms lower surface 22, upper barrier layer 31 forms both upper surface 21 and side surfaces 23 and 24. The rationale for the difference in thickness is that upper barrier layer 31 may stretch to a greater degree in order to form both upper surface 21 and side surfaces 23 and 24. Accordingly, differences between the original, pre-stretched thicknesses of barrier layers 31 and 32 compensate for thinning in upper barrier layer 31 that may occur when upper barrier layer 31 is stretched or otherwise distorted during the formation of upper surface 21 and side surfaces 23 and 24.

Figure 14D:
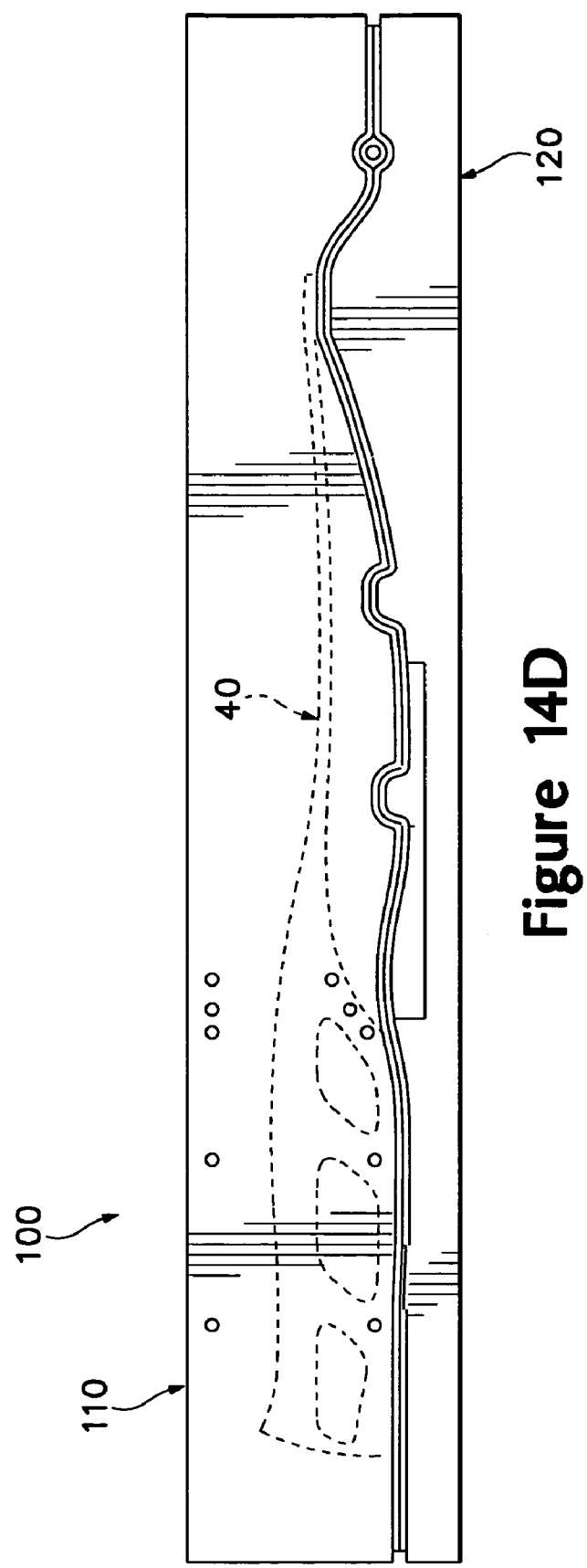

Once barrier layers 31 and 32 are positioned, mold portions 110 and 120 are then located such that ridge 112 aligns with ridge 122 and the various protrusions 113 are aligned with protrusions 123. In this position, the areas of mold portions 110 and 120 that form corresponding portions of sole component 20 are positioned on opposite sides of barrier layers 31 and 32 and are also aligned. Mold portions 110 and 120 then translate toward each other such that mold 100 contacts and compresses barrier layers 31 and 32, as depicted in FIG. 14D.

As mold 100 contacts and compresses portions of barrier layers 31 and 32, a fluid, such as air, having a positive pressure in comparison with ambient air may be injected between barrier layers 31 and 32 to induce barrier layers 31 and 32 to respectively contact and conform to the contours of mold portions 110 and 120. A variety of methods may be employed to pressurize the area between barrier layers 31 and 32. For example, the fluid may be directed through the conduit formed by channels 114 and 124. That is, a needle may placed between barrier layers 31 and 32 and between channels 114 and 124 to deliver a fluid that travels down the conduit and into the area forming sole component 20. Air may also be removed from the area between barrier layers 31 and 32 and mold portions 110 and 120 through vents 115 and 125, thereby drawing barrier layers 31 and 32 onto the surfaces of mold portions 110 and 120. That is, at least a partial vacuum may be formed between the barrier layers 31 and 32 and the surfaces of mold portions 110 and 120. In addition, drawing barrier layers 31 and 32 onto the surfaces of mold portions 110 and 120 also draws barrier layers 31 and 32 into contact with reinforcing structure 40. Accordingly, barrier layers 31 and 32 contact and are bonded to reinforcing structure 40 during this portion of the manufacturing process.

As the area between barrier layers 31 and 32 is pressurized and air is removed from the area between barrier layers 31 and 32 and from between mold portions 110 and 120, barrier layers 31 and 32 conform to the shape of mold 100 and are bonded together. More specifically, barrier layers 31 and 32 stretch, bend, or otherwise conform to extend along the surfaces of cavity 111 and surface 121 and form the general shape of bladder 30. Ridge 112 and ridge 122 also compress a linear area of barrier layers 31 and 32 to form peripheral bond 33. In addition, barrier layers 31 and 32 conform to the shapes of protrusions 113 and 123 and are bonded together by being compressed between protrusions 113 and 123, thereby forming interior bonds 34.

Although barrier layers 31 and 32 conform to extend along the surfaces of cavity 111 and surface 121, upper barrier layer 31 generally does not contact the portions of cavity 111 that are covered by reinforcing structure 40. Rather, upper barrier layer 31 contacts and is compressed against the inward-facing surface of reinforcing structure 40, thereby bonding upper barrier layer 31 to reinforcing structure 40. Referring to FIG. 9F, the outward-facing surface of connecting portion 43 is generally flush with lateral side surface 23, and lateral side surface 23 forms a recess that receives connecting portion 43. That is, lateral side surface 23 curves into bladder 20 so as to form a depression in which connecting portion 43 is positioned. This configuration results from the manner in which reinforcing structure 40 is placed within upper mold portion 110 and upper barrier layer 31 is compressed against the inward-facing surface of reinforcing structure 40 and bonded to reinforcing structure 40.

The various outward-facing surfaces of reinforcing structure 40 are generally flush with surfaces 21–24 of bladder 30. As air pressurizes the area between barrier layers 31 and 32 and air is drawn out of mold 100 through vents 115 and 125, both upper barrier layer 31 and reinforcing structure 40 are compressed against the surface of cavity 111. Upper barrier layer 31 contacts the inward-facing surface of reinforcing structure 40, conforms to the shape of reinforcing structure 40, extends around reinforcing structure 40, and contacts the surface of cavity 111. In this manner, the surfaces of reinforcing structure 40 are formed to be generally flush with surfaces 21–24 of bladder 30.

As barrier layers 31 and 32 conform to the shape of mold 100 and are bonded together, upper barrier layer 31 bends at the location of upper portion 41 to form side surfaces 23 and 24. Accordingly, upper barrier layer 31 extends in a generally horizontal direction to form upper surface 21, and upper barrier layer 31 bends at the location of upper portion 41 to extend in a generally vertical direction and form side surfaces 23 and 24. Accordingly, upper barrier layer 31 bends during the process of molding bladder 30 in order to form upper surface 21 and side surfaces 23 and 24.

The edges of reinforcing structure 40 exhibit a beveled configuration, as depicted in FIG. 9F, in order to facilitate the flush nature of the interface between reinforcing structure 40 and bladder 30. In general, if reinforcing structure 40 were formed to have a rectangular cross-section without beveling, for example, upper barrier layer 31 may be required to stretch to a greater degree, thereby causing undue thinning of upper barrier layer 31 in areas adjacent to reinforcing structure 40. In addition, a lack of beveling may also cause a gap or space to form between upper barrier layer 31 and reinforcing structure 40. Accordingly, reinforcing structure 40 is formed to exhibit beveled edges.

During formation of the bond between upper barrier layer 31 and reinforcing structure 40, air may become trapped between upper barrier layer 31 and reinforcing structure 40, thereby reducing the effectiveness of the bond. In order to facilitate the removal of air from between upper barrier layer 31 and reinforcing structure 40, a plurality of vent apertures 44 may be formed through selected locations of reinforcing structure 40, and may be formed through the area of upper portion 41 that corresponds with upper surface 21 in order to limit the visibility of vent apertures 44. Vent apertures provide outlets for air and may correspond in position with the various vents 115 in upper mold portion 110.

Figure 14E:
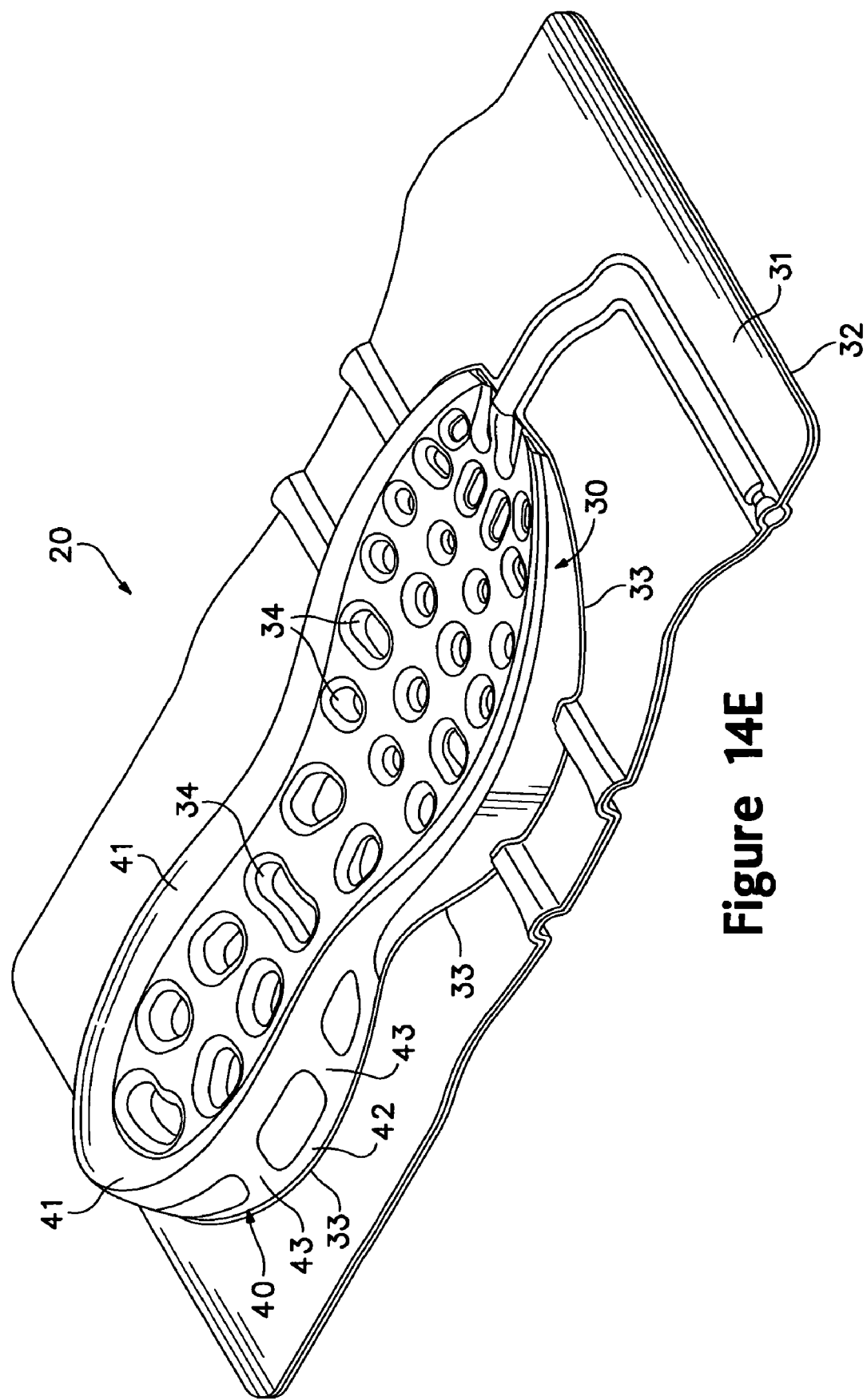

Once sole component 20 is formed within mold 100, mold portions 110 and 120 separate such that reinforcing structure 40 and barrier layers 31 and 32 may be removed from mold 100, as depicted in FIG. 14E. The polymer materials forming reinforcing structure 40 and barrier layers 31 and 32 are then permitted to cool, and a pressurized fluid may be injected through the conduit formed by channels 114 and 124. The conduit is then sealed to enclose the fluid within bladder 30. In addition, excess portions of barrier layers 31 and 32 may be trimmed or otherwise removed from sole component 20. The excess portions may them be recycled or reutilized to form additional thermoplastic sheets.

Connecting portions 43 are placed in tension by the pressurized fluid and operate to restrict the degree of outwardly-directed swelling (i.e., distension) in side surfaces 23 and 24. Prior to pressurization, reinforcing structure 40 and bladder 30 are generally in a non-tensioned state. The pressurized fluid, however, exerts an outward force upon bladder 30, thereby placing barrier layers 31 and 32 in tension. In the absence of reinforcing structure 40, the degree of outwardly-directed swelling of barrier layers 31 and 32 may induce a rounded or otherwise bulging configuration in side surfaces 23 and 24. Reinforcing member 40, and particularly connecting portions 43, restrain the outwardly-directed swelling due to the outward force of the pressurized fluid. Accordingly, tension is induced in connecting portions 43 through the pressurization of bladder 30.

The distribution and configurations of the various interior bonds 34, as discussed above, has an effect upon the compressibility of sole component 20. Modifications relating to the distribution and configurations of interior bonds 34, which are determined by the positions of protrusions 113 and 123 may be utilized to control various foot motions, such as pronation. Accordingly, foot motions may be controlled through modifications of mold portions 110 and 120. Footwear 10 may also be configured for use during different activities, such as running, basketball, and football, through modifications in the overall thickness of sole component 20, the distribution and configurations of the various interior bonds 34, and the configuration of reinforcing structure 40. Whereas a greater overall thickness of sole component 20 is suitable for running activities in order to provide greater cushioning, for example, a lesser overall thickness may be more appropriate for basketball and football in order to enhance stability. Controlling pronation may also be an issue with running activities, and protrusions 113 and 123 may be distributed and configured to control pronation when footwear 10 is intended for running. In contrast, the degree to which pronation is controlled through the distribution and configuration of protrusion 113 and 123 may be lessened when footwear 10 is intended for basketball or football. Accordingly, variations in the dimensions and configuration of sole component 20 may be utilized to tailor footwear 10 to specific athletic activities.

Interior bonds 34 may also be configured to affect other properties of sole component 20, such as stability. In some embodiments of the invention, selected interior bonds 34 may have an elongated configuration. Referring to the figures, an elongated interior bond 34 is positioned at the interface of midfoot region 16 and heel region 17 and extends in a medial-lateral direction. Another elongated interior bond 34 is positioned in heel region 17. Additional elongated interior bonds 34 are positioned in forefoot region 15 and may be oriented longitudinally or in the medial-lateral direction. In forward portions of forefoot region 15, for example, the elongate interior bonds 34 extend longitudinally. In comparison with round, triangular, or otherwise non-elongated interior bonds 34, the elongated interior bond 34 may exhibit increased resistance to shear forces, thereby enhancing the medial to lateral stability of sole component 20. Accordingly, the formation of elongated interior bonds 34 may be one manner of enhancing the overall stability of footwear 10.

The degree of elongation in the various interior bonds 34 also has an effect upon the compressibility of sole component 20 in the area of interior bonds 34. In general, circular interior bonds 34 exhibit greater compressibility than elongate interior bonds 34. With respect to forefoot region 15, many of the interior bonds 34 positioned between flexion indentations 35 exhibit a circular configuration in order to enhance the compressibility of this area. In forward portions of forefoot region 15, however, many of the interior bonds 34 exhibit an elongate configuration that decreases the compressibility of this area.

Various characteristics relating to the configuration of interior bonds 34 affects the overall configuration of sole component 20. In general, the spacing of interior bonds 34 in the medial to lateral direction is approximately 0.86 inches, but may be in a range of 0.5 to 0.6 inches in forward portions of forefoot region 15. The spacing of interior bonds 34 in the longitudinal direction is approximately 0.98 inches through heel region 17 and portions of midfoot region 16, but may be in a range of 0.4 to 0.9 inches in forefoot region 17. The radius formed in the transitions between surfaces 21 and 22 and the material extending inward to form interior bonds 34 has an effect upon the compressibility of interior bonds 34 and is generally selected to be in a range of 0.125 and 0.150 inches. In forward portions of forefoot region 15, however, the radius may be 0.1 inches.

Following the formation of sole component 20, upper 11 may be secured to upper surface 21 and outsole 14 may be secured to lower surface 22, thereby substantially completing the manufacture of footwear 10. The surface characteristics of sole component 20 may be adjusted to promote bonding between sole component 20 and other components of footwear 10. In general, the strength of an adhesive bond between lower surface 22 and outsole 14, for example, may be strengthened by forming lower surface 22 to have a relatively rough texture. Whereas an adhesive may not effectively adhere to an entirely smooth surface, the texture of a rough surface provides enhanced adhesive bonding. Although imparting a relatively rough texture to surfaces 21 and 22 may enhance bonding, a detriment to the relatively rough texture is decreased visibility through the polymer material forming bladder 30. Accordingly, a relatively smooth texture may be imparted to side surfaces 23 and 24 to enhance the visibility of those portions of sole component 20 that are visible when incorporated into footwear 10. The surface characteristics of sole component 20 are generally determined by the surface characteristics of mold 100. The portions of cavity 111 and surface 121 that form upper surface 21 and lower surface 22 may, therefore, be less smooth than portions of cavity 111 that form side surfaces 23 and 24. Texturing surfaces of sole component 20 may also enhance bonding between bladder 30 and reinforcing structure 40. In some embodiments of the invention, the inward-facing surface of reinforcing structure 40 and the portions of upper barrier layer 31 that contact reinforcing structure 40 may be textured prior to bonding.

The process of bonding outsole 14 to lower surface 22 may be performed following the formation of sole component 20, as discussed above. Alternately, one or more traction elements may be located within mold 100 in order to form a bond between the traction elements and lower surface 22 during the thermoforming process. That is, the traction elements may be bonded to bladder 30 through a process that is similar to the process of bonding reinforcing structure 40 to bladder 30. The traction elements may be one or more elements of rubber material, for example, that are similar in configuration to a conventional outsole. The traction elements may also be additional elements of thermoplastic material that reinforce those areas of sole component 20 that contact the ground. Accordingly, the traction elements may have a variety of configurations within the scope of the present invention.

Figure 9G:
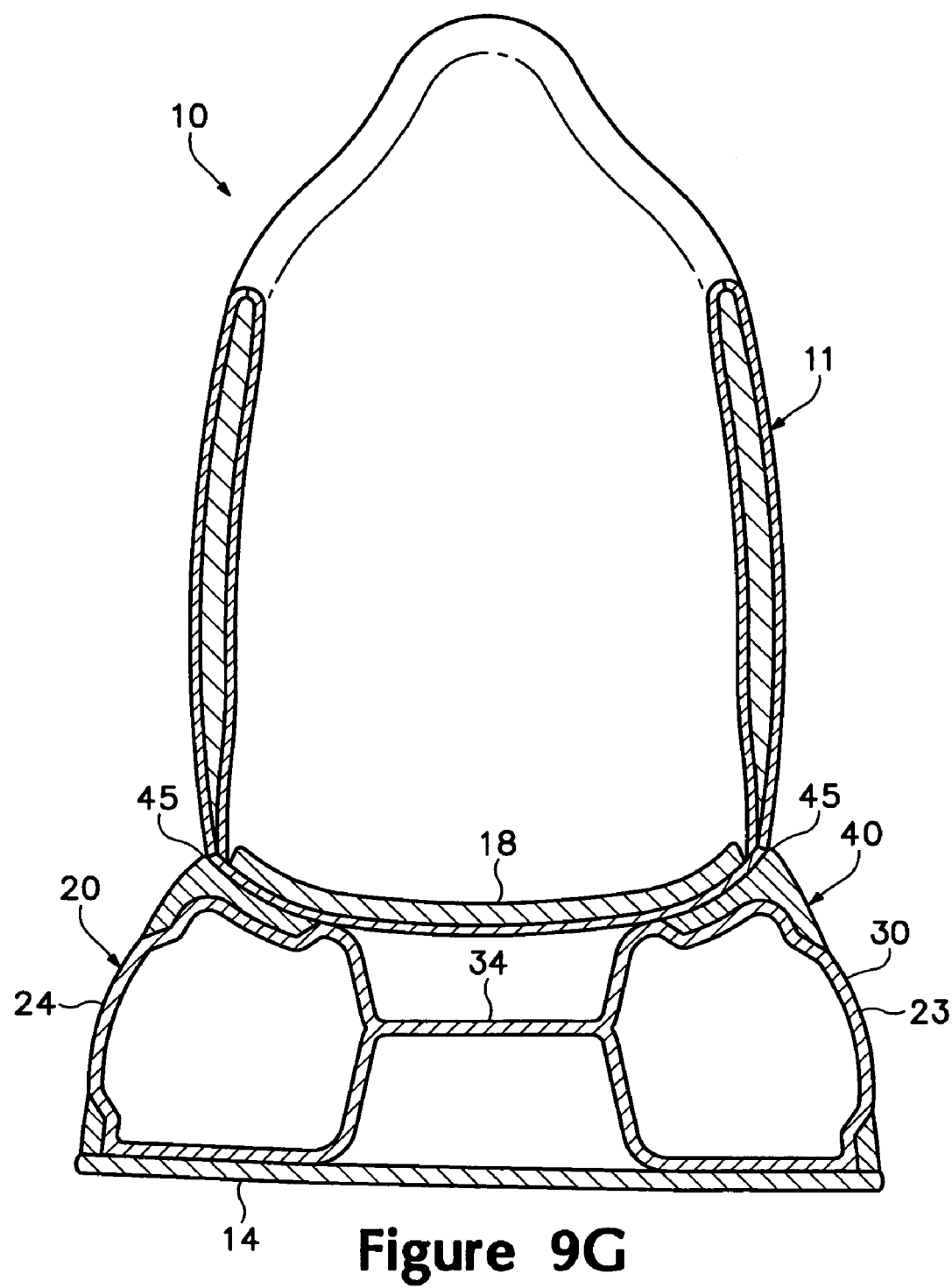
FIG. 9G is a cross-sectional view of the article of footwear, as defined by section line 9G—9G in FIG. 1.

Upper portion 41 of reinforcing structure 40 extends along both the medial and lateral sides of sole component 40 and provides a defined lasting line for securing upper 11 to sole component 20, as depicted in FIG. 9G. One issue with some sole structures is that the precise extent to which the upper should be secured to the sole structure is not evident from the configuration of the sole structure. Referring to the cross-sections of FIGS. 9A–9E and 9G, reinforcing structure 40 forms a ridge 45 on both the medial and lateral sides of sole component 20. Ridge 45 is an identifiable line that defines a lasting surface, thereby defining the portions of sole component 20 to which upper 11 should be secured. More particularly, upper 11 should be secured to the pasting surface, which is the portions of upper surface 21 that are positioned inward of ridge 45. Accordingly, an adhesive, for example, may be placed between the portions of ridge 45 that are located on the medial and lateral sides in order to properly secure upper 11 to the lasting surface of sole component 20.

The manner in which mold 100 is structured affects the resulting properties of sole component 20. For example, the configurations of mold portions 110 and 120 have an effect upon the degree of stretch that may occur in barrier layers 31 and 32. As discussed above, the thicknesses of barrier layers 31 and 32 may be selected to account for stretching during the molding process. In addition, however, mold portions 110 and 120 may be configured with draft angles that limit the degree of stretching in barrier layers 31 and 32, thereby controlling the resulting thickness of barrier layers 31 and 32. For example, the draft angles of the various protrusions 113 and 123 may range from 5 to 8 degrees and may extend upward to 13 degrees in heel region 17.

The configurations of mold portions 110 and 120 also affect the placement of peripheral bond 33. One advantage of placing peripheral bond 33 at the interface of lower surface 22 and side surfaces 23 and 24 is that unobstructed visibility is retained through side surfaces 23 and 24. This configuration requires that upper barrier layer 31 stretch to a greater degree than lower barrier layer 32 in order to also form side surfaces 23 and 24. In further embodiments of the invention, however, peripheral bond 33 may be positioned at a midpoint of side surface 23 and 24, or peripheral bond 33 may be positioned at the interface of upper surface 21 and side surfaces 23 and 24. Accordingly, the elevation of peripheral bond 33 may be selected to limit or otherwise control the degree of stretch in barrier layers 31 and 32.

The relative elevations of interior bonds 34 also affect the degree of stretching that occurs in barrier layers 31 and 32. If, for example, interior bonds 34 are located closer to lower surface 22 than upper surface 21, then upper barrier layer 31 must stretch downward to form the indentations associated with interior bonds 34. Similarly, locating interior bonds 34 closer to upper surface 21 causes lower barrier layer 32 to stretch upward to form the indentations associated with interior bonds 34. When determining the configuration of mold 100, the degree of stretch in barrier layers 31 and 32 may be calculated, and the relative heights of protrusions 113 and 123 may be selected to either increase or decrease the degree of stretch that occurs in areas of barrier layers 31 and 32. Accordingly, the various interior bonds may each be formed at different elevations in order to control stretch in barrier layers 31 and 32.

The relative heights of the various interior bonds 34 also affects the compressibility of sole component 20. In general, the thicknesses of barrier layers 31 and 32 is proportional to the stiffness of barrier layers 31 and 32. By forming interior bonds 34 adjacent to lower surface 22, upper barrier layer 31 is drawn downward and stretched. The stretching lessens the thickness of upper barrier layer 31 and decreases the stiffness of upper barrier layer 31, thereby increasing compressibility. By forming interior bonds 34 adjacent to upper surface 21, however, upper barrier layer 31 is stretched to a lesser degree, thereby increasing the thickness of upper barrier layer 31 and decreasing compressibility.

As barrier layers 31 and 32 stretch during the thermoforming process, the thickness of barrier layers 31 and 32 decreases. The desired resulting thickness of barrier layers 31 and 32 generally depends upon the specific use and configuration of footwear 10. Selecting the position of peripheral bond 33, the locations of interior bonds 34, and the initial thicknesses of barrier layers 31 and 32 provides control over the degree of stretch in barrier layers 31 and 32. Accordingly, the position of peripheral bond 33, the locations of interior bonds 34, and the initial thicknesses of barrier layers 31 and 32 may be selected in order to optimize the overall thickness of bladder 30 in each area of sole component 20.

Controlling the degree of stretch in barrier layers 31 and 32 may also be utilized to provide reinforcement to portions of bladder 30. In general, areas of bladder 30 that have a greater thickness will be more durable than areas with a lesser thickness. The differences in the modulus of elasticity between the material forming bladder 30 and the material forming reinforcing structure 40 may cause wear at the interfaces between bladder 30 and reinforcing structure 40. Accordingly, the degree of stretch in barrier layers 31 and 32 may be controlled to increase the thickness of bladder 30 in areas adjacent to reinforcing structure 40. As discussed above, the degree of stretch in barrier layers 31 and 32 may be controlled through a variety of mechanisms, including the configuration of mold 100, the relative thicknesses of barrier layers 31 and 32, and the positions for forming interior bonds 34, for example.

The degree of outwardly-directed swelling (i.e., distension) of barrier layers 31 and 32 due to the outward force of the pressurized fluid is restricted by interior bonds 34. Despite the presence of interior bonds 34, the portions of barrier layers 31 and 32 forming upper surface 21 and lower surface 22 may bow outward upon pressurization with the fluid sealed within bladder 30. The outward bowing effectively bends areas of barrier layers 31 and 32 and may induce additional stresses in the thermoplastic polymer material forming bladder 30. One manner of reducing the additional stresses in the thermoplastic polymer material forming bladder 30 is to mold or otherwise form barrier layers 31 and 32 to include curved surfaces corresponding with the distension that would occur as a result of pressurization.

Although thermoforming is a suitable manner of forming sole component 20, a blow-molding process may also be utilized. In general, a suitable blow-molding process involves positioning reinforcing structure 40 within at least one of two mold portions and then positioning a parison between the mold portions, such as mold portions 110 and 120. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include the materials discussed above with respect to bladder 30. Following placement of the parison between the mold portions, the mold portions close upon the parison and pressurized air within the parison induces the liquefied elastomeric material to contact the surfaces of the mold. In addition, closing of the mold portions and the introduction of pressurized air induces the liquefied elastomeric material to contact the surfaces of reinforcing structure 40. Air may also be evacuated from the area between the parison and the mold to further facilitate molding and bonding. Accordingly, sole component 20 may also be formed through a blow molding process wherein reinforcing structure 40 is placed within the mold prior to the introduction of the molten polymer material.

A variety of other manufacturing techniques may also be utilized to form sole component 20, in addition to thermoforming and blow-molding. For example, bladder 30 may be formed separate from reinforcing structure 40, and both components may be subsequently bonded together. A dual-injection technique may also be utilized to simultaneously form bladder 30 and reinforcing structure 40 from separate materials. In some embodiments, a first element corresponding with upper surface 21 and side surfaces 23 and 24 may be formed, a second element corresponding with lower surface 22 may be joined thereto, and a third element corresponding with reinforcing structure 40 may then be secured to the exterior. Accordingly, structures having the general shape and features of sole component 20 may be formed from a variety of processes.

Additional Sole Component Configurations

Figure 15:
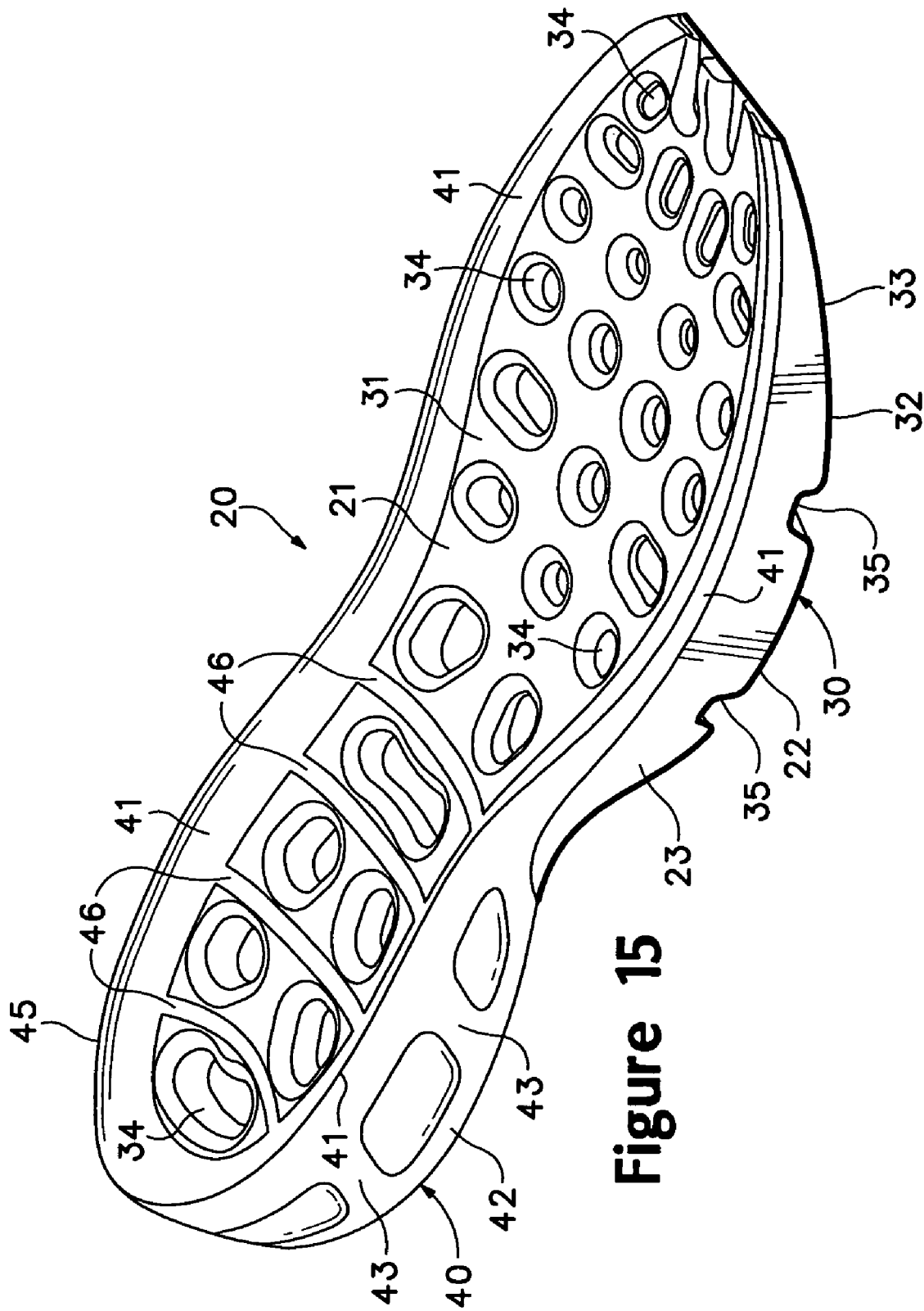
FIG. 15 is a perspective view of a second sole component in accordance with the present invention.
Figure 16:
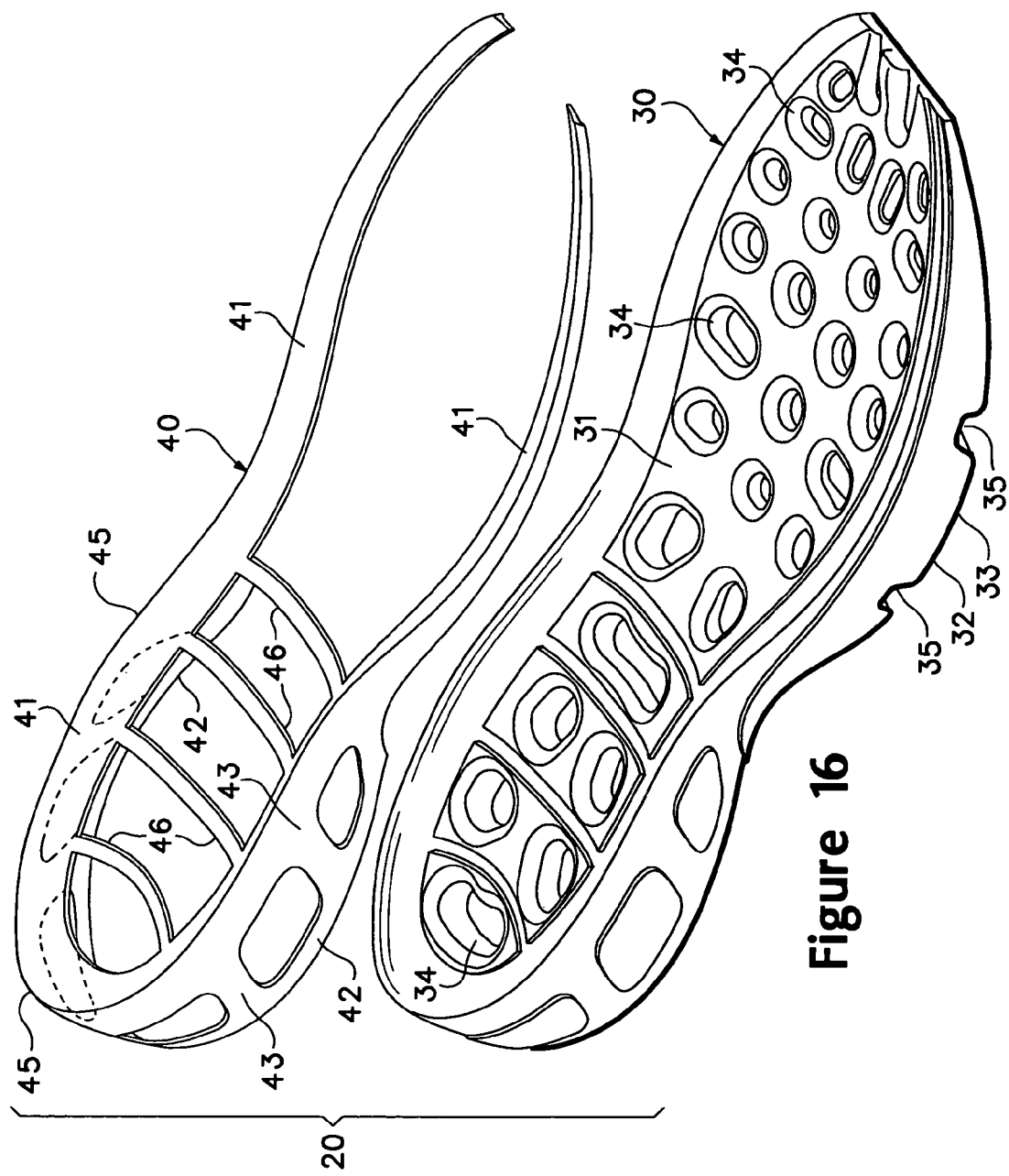
FIG. 16 is an exploded perspective view of the second sole component.

The specific configuration of sole component 20 disclosed above is intended to provide an example of a sole component within the scope of the present invention. Various alternate configurations, however, may also be utilized. Referring to FIGS. 15 and 16, sole component 20 is depicted as having a plurality of bridges 46 that extend laterally across upper surface 21. More particularly, four bridges 46 extend between medial and lateral sides of upper portion 41 and enhance the stability of sole component 20. As depicted in the figures, bridges 46 are relatively narrow structures that are formed of unitary (i.e., one piece) construction with reinforcing structure 40 and are, therefore, secured to bladder 30. As with other portions of reinforcing structure 40, bridges 46 may be recessed within indentations in bladder 30 and may be bonded to bladder 30 during the thermoforming process. Although bridges 46 are depicted as being relatively narrow, the width of bridges 46 may be increased significantly depending upon the desired properties of sole component 20, and bridges 46 may form a plate that extends over heel region 17. Furthermore, bridges 46 may extend over lower surface 22 or both of surfaces 21 and 22, and bridges 46 may extend through midfoot region 16 or heel region 17. Accordingly, the specific configuration of bridges 46 may vary significantly within the scope of the present invention.

Figure 17:
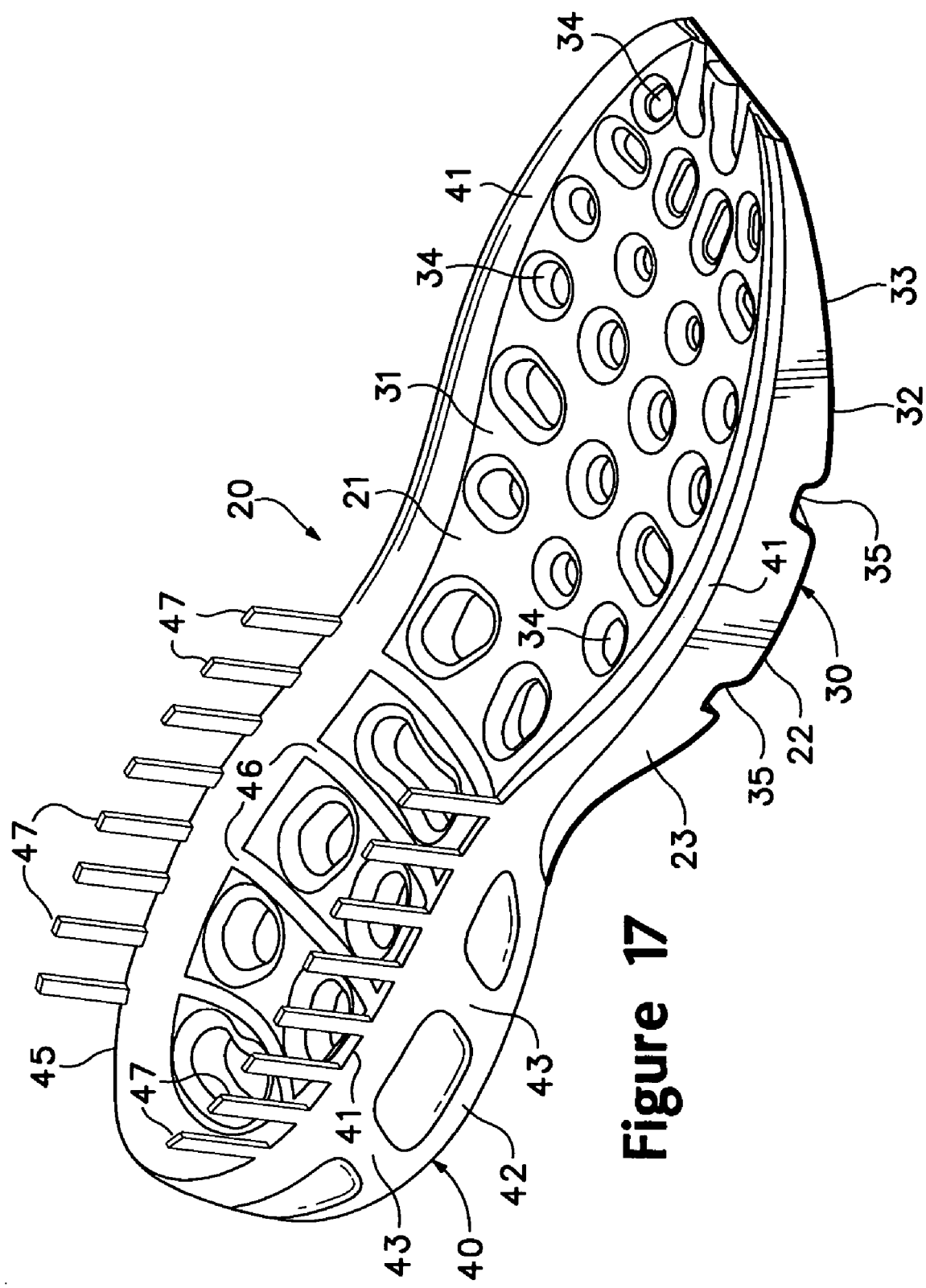
FIG. 17 is a perspective view of a third sole component in accordance with the present invention.
Figure 18:
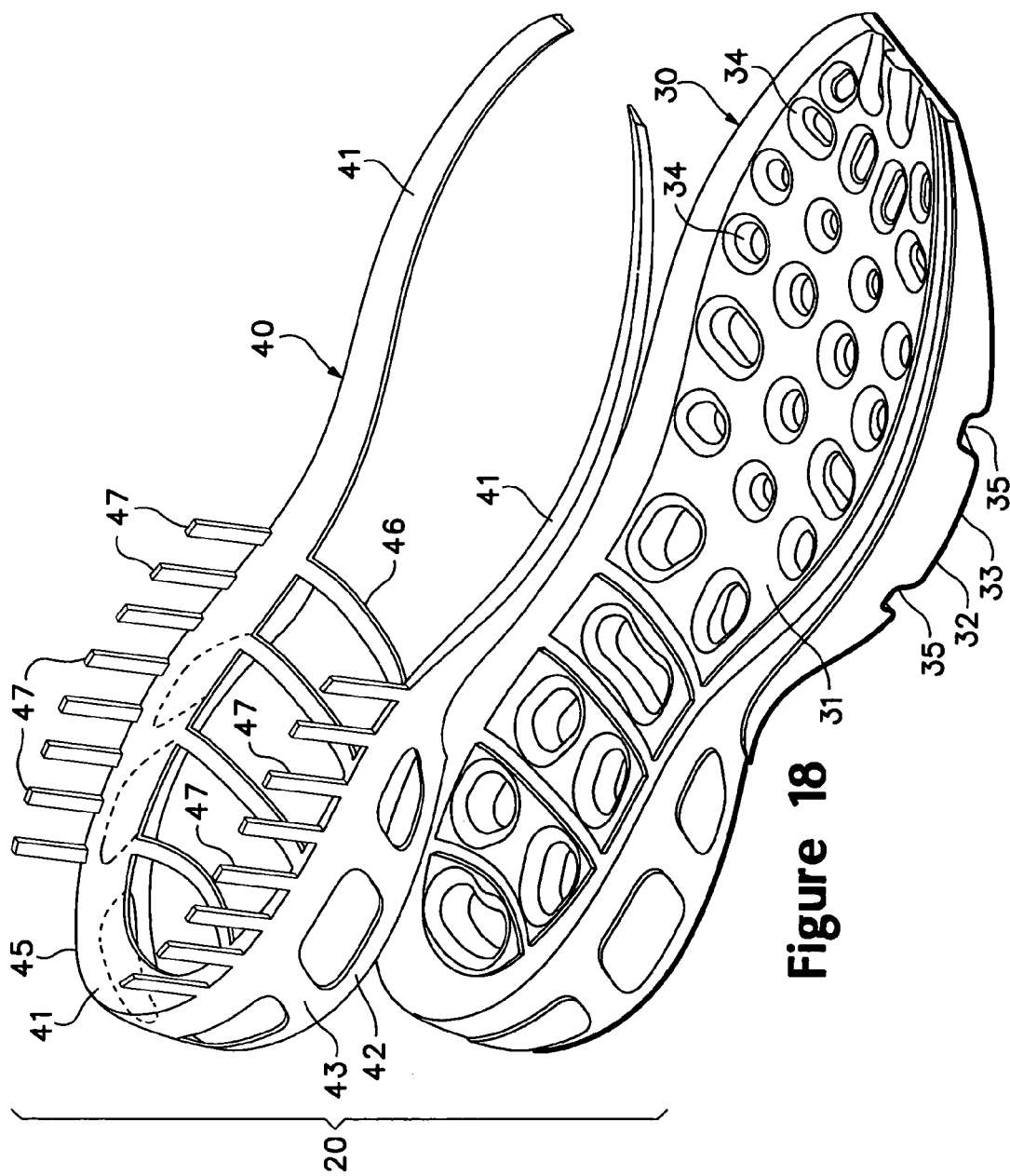
FIG. 18 is an exploded perspective view of the third sole component.
Figure 19:
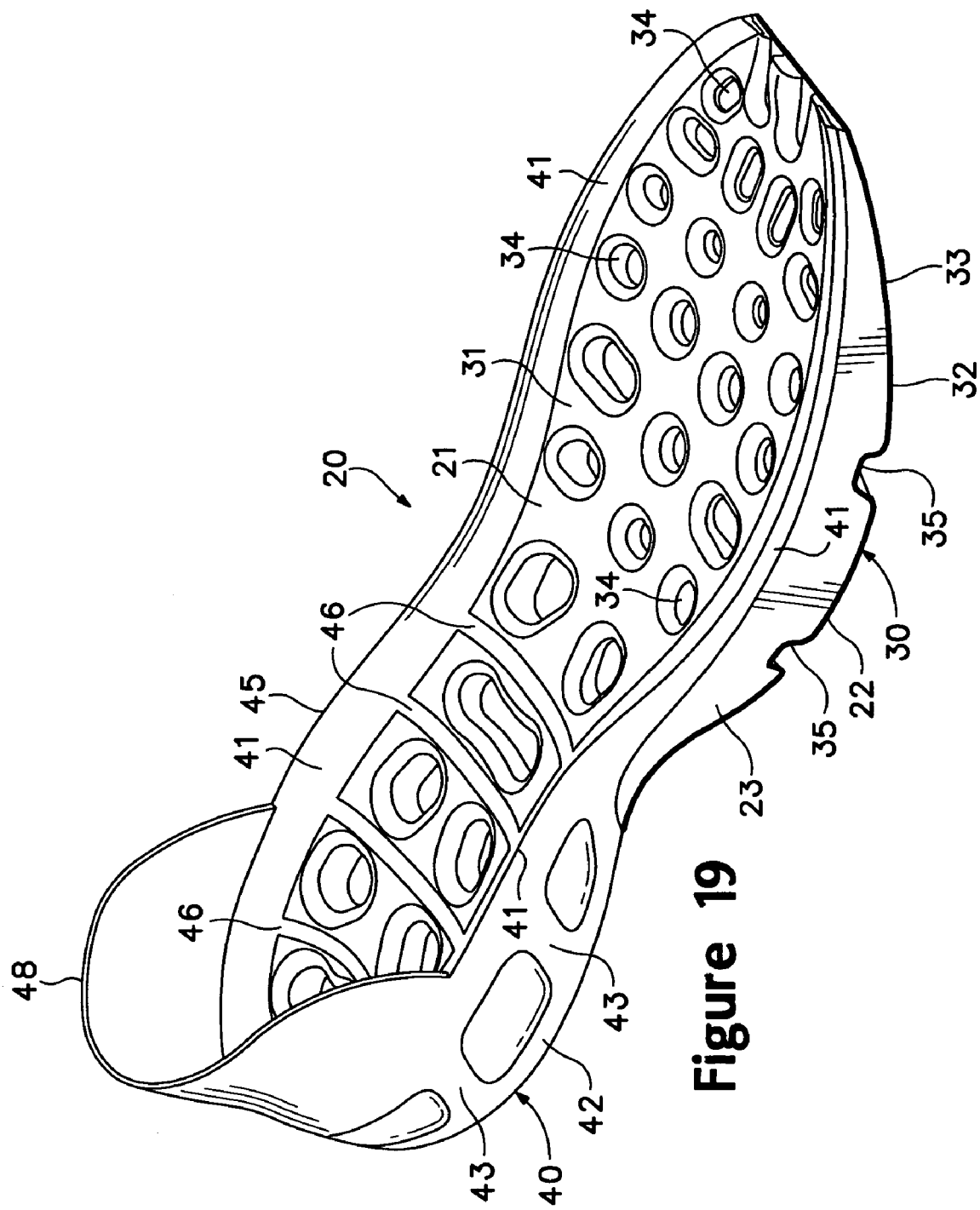
FIG. 19 is a perspective view of another embodiment of the third sole component.
Figure 20:
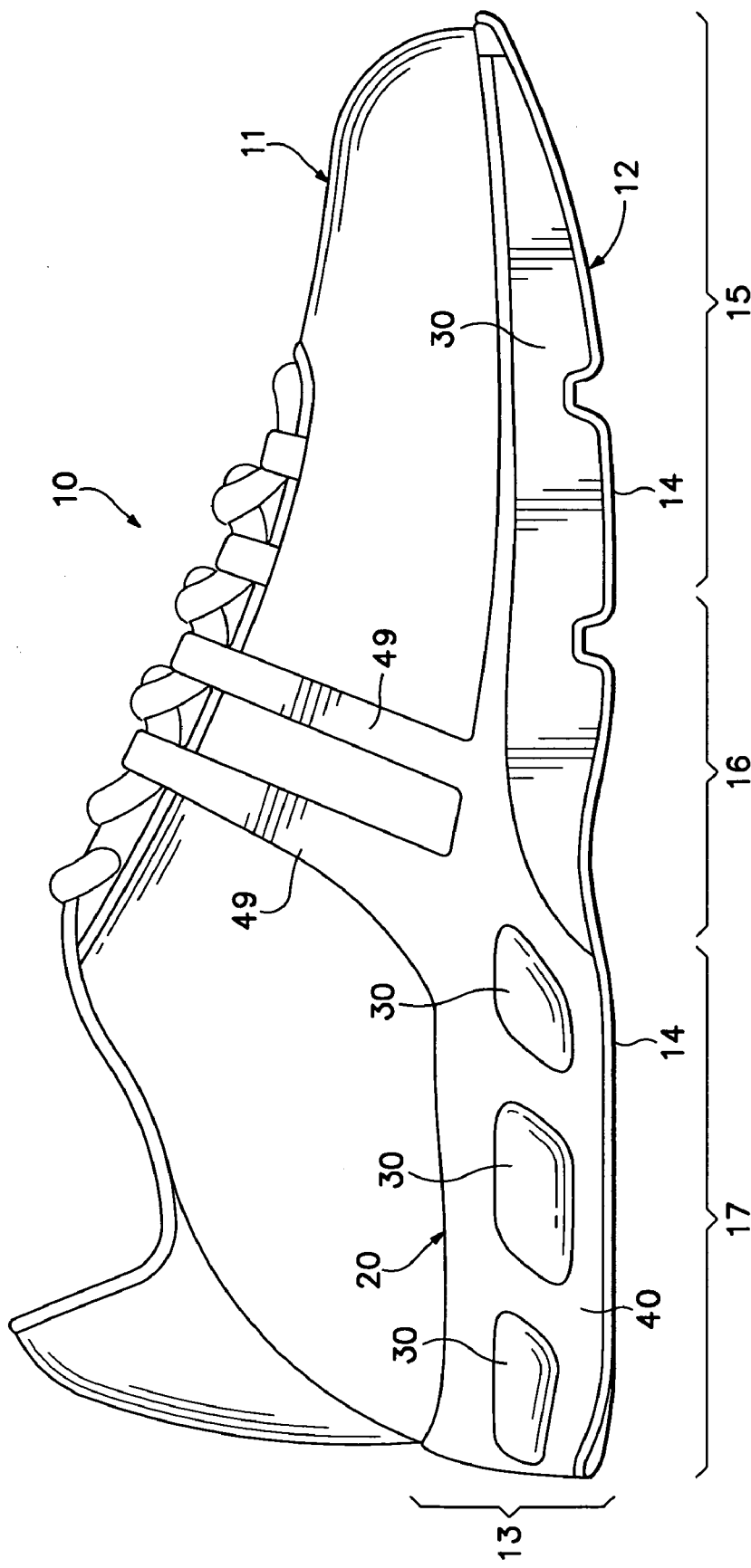
FIG. 20 is a side elevational view of the footwear depicting yet another embodiment of the third sole component.

In addition to bridges 46, sole component 20 may also include a plurality of extensions 47, as depicted in FIGS. 17 and 18. Extensions 47 are portions of reinforcing structure 40 that extend upward from sole component 20. Extensions 47 may be secured to an exterior of upper 11 or may extend between the material elements forming upper 11 in order to further secure sole component 20 to upper 11. One purpose of extensions 47 may be to extend around the foot in heel region 17, for example, to provide additional support for the foot. Accordingly, extensions 47 may serve the purpose of a conventional heel counter or other stabilizing structure. Although extensions 47 may exhibit the elongated structure depicted in the figures, a similarly-located cup-like structure 48 that is analogous to structure of the conventional heel counter may be formed as a part of reinforcing structure 40, as depicted in FIG. 19. In yet another embodiment, as depicted in FIG. 20, extensions 47 may be replaced by a plurality of lacing members 49 that are positioned to extend over the in step portion of upper 11 and form apertures for receiving the lace. Lacing members 49 may be utilized, therefore, as part of the lacing system that modifies the dimensions of the interior void, thereby securing the foot within the interior void and facilitating entry and removal of the foot from the interior void.

Figure 21:
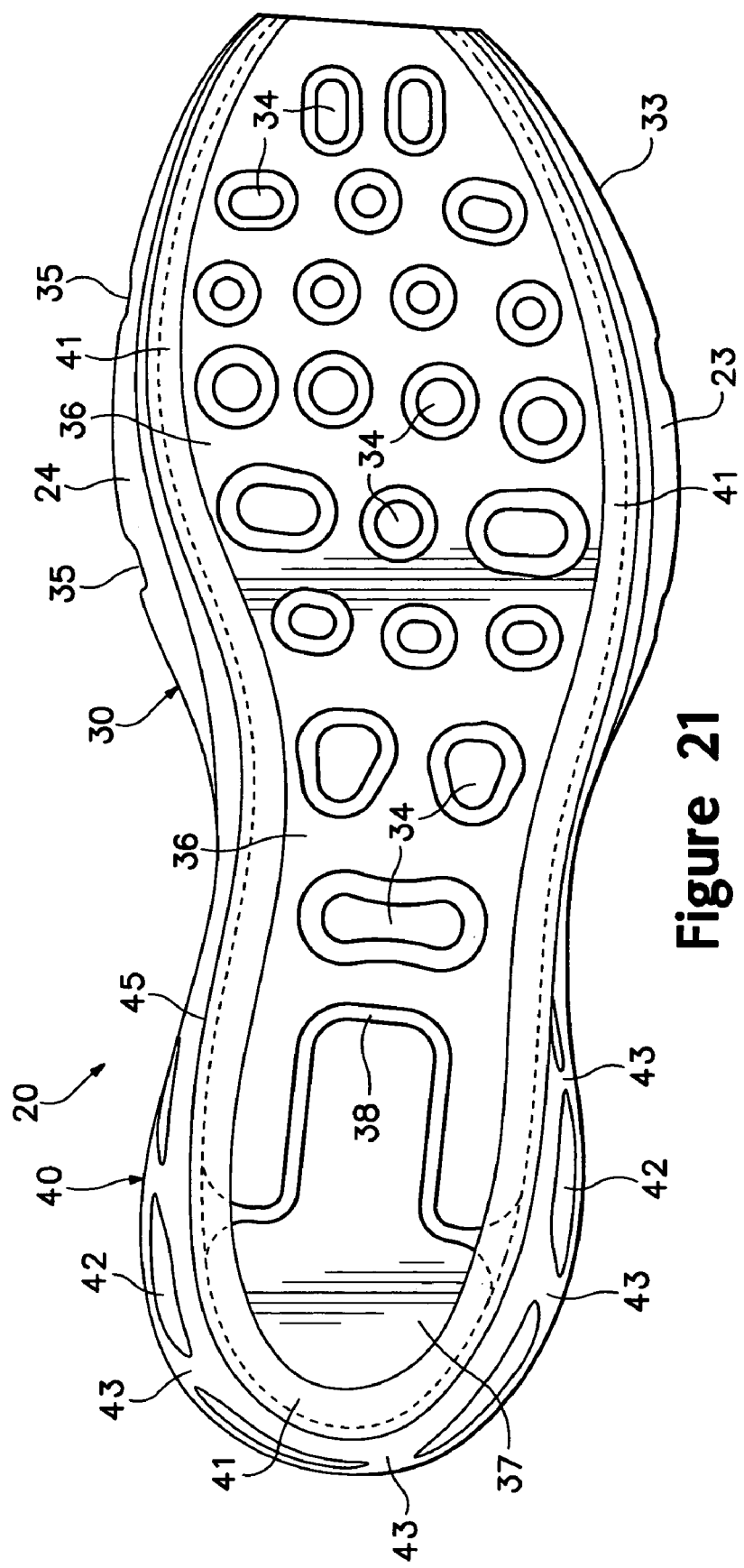
FIG. 21 is a top plan view of a fourth sole component.

Bladder 30, as disclosed in the above material, forms a single, sealed chamber for enclosing the pressurized fluid. Referring to FIG. 21, bladder 30 is depicted as having a first chamber 36 and a second chamber 37 that are separated by a bond 38. First chamber 36 extends through each of regions 15–17, whereas second chamber 37 is limited to heel region 17. The pressure of the fluid within second chamber 37 may be less than the pressure of the fluid within first chamber 36 such that different areas of bladder 30 exhibit differing cushioning and compressibility properties. In further embodiments, bladder 30 may incorporate two or more separate sealed chambers positioned in other portions of bladder 30. Accordingly, the configurations of the separate sealed chambers, as well as the pressures of the fluid within the chambers may vary significantly within the scope of the present invention.

The sole structures of conventional articles of athletic footwear generally incorporates a polymer foam material, such as polyurethane or ethylvinylacetate. One drawback to polymer foam relates to the concept of compression set. As an individual utilizes an article of footwear, the sole structure is repetitively compressed. Polymer foam materials generally incorporate various gas-filled cells that may collapse or otherwise deteriorate following repetitive compressions, thereby modifying the cushioning or stability properties of the sole structure. In contrast with the conventional sole structures, sole structure 12, as described above, does not incorporate a polymer foam material. In some embodiments, as described below, a polymer foam material 18 may be utilized in combination with sole component 20.

Figure 22:
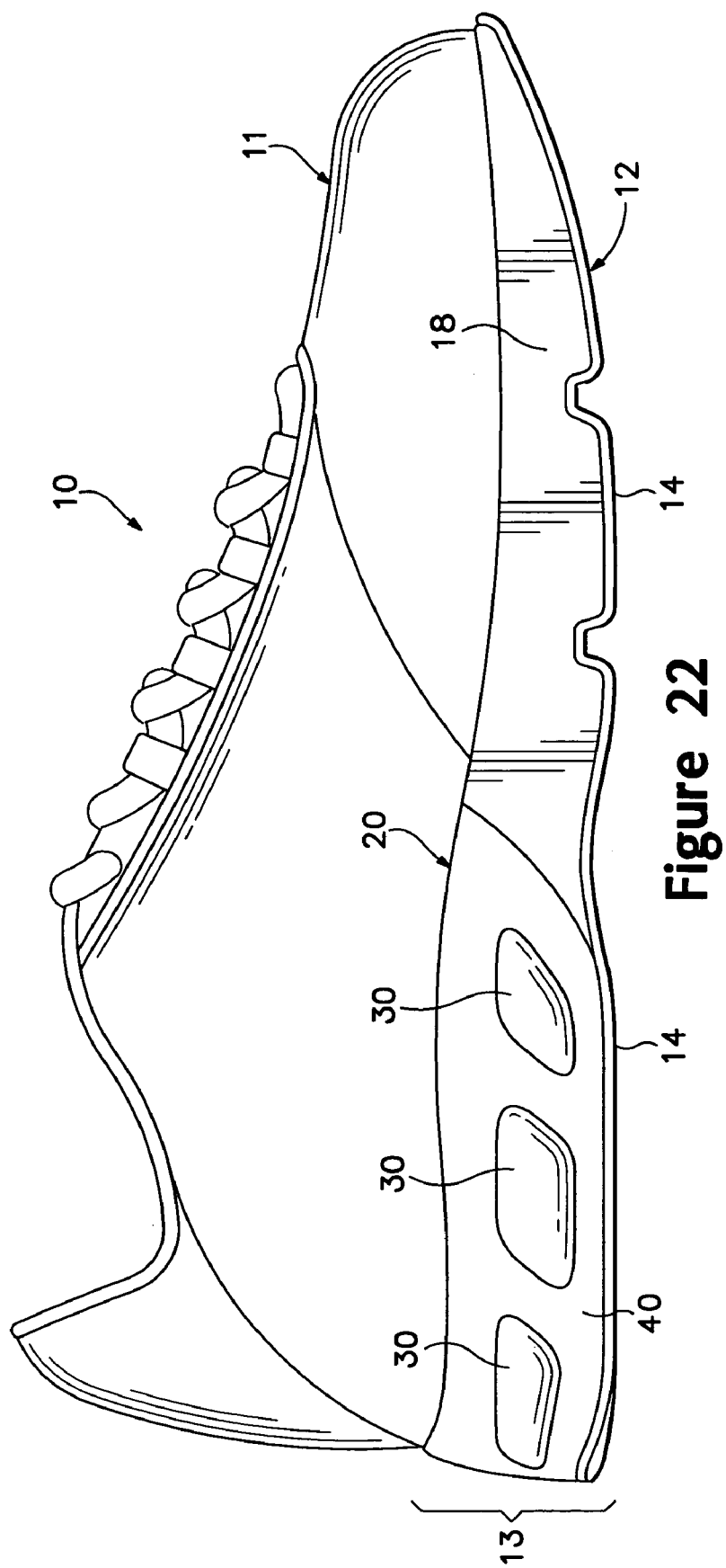
FIG. 22 is a lateral side elevational view of an article of footwear having a fifth sole component in accordance with the present invention.
Figure 23:
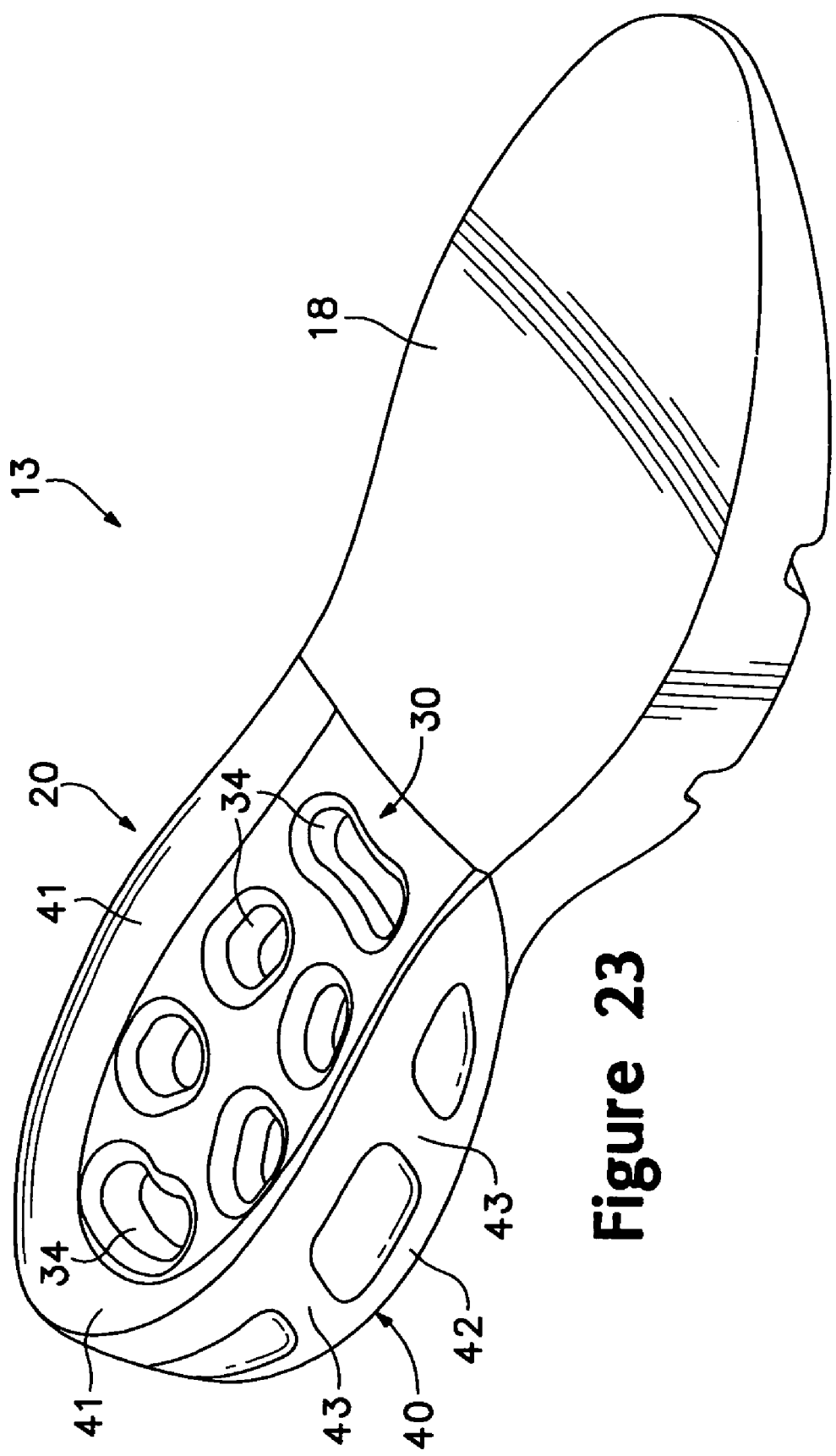
FIG. 23 is a perspective view of the fifth sole component.

In the various embodiments of sole component 20 discussed above, sole component 20 extends through each of regions 15–17 and, therefore, extends under a substantial portion of the longitudinal length of the foot. Referring to FIGS. 22 and 23, sole component 20 extends only through heel region 17, and polymer foam material 18 forms midsole 13 in forefoot region 15 and midfoot region 16. Sole component 20 may, therefore, extend through only a portion of the longitudinal length of footwear 10. In further embodiments, sole component 20 may also be limited to a single side of sole structure 12. For example, the lateral side of sole structure 12 may incorporate sole component 20, whereas the medial side incorporates foam material 18. In yet further embodiments, a portion of bladder 30 may be replaced by foam material 18 such that reinforcing structure 40 extends around both bladder 30 and foam material 18.

Figure 24:
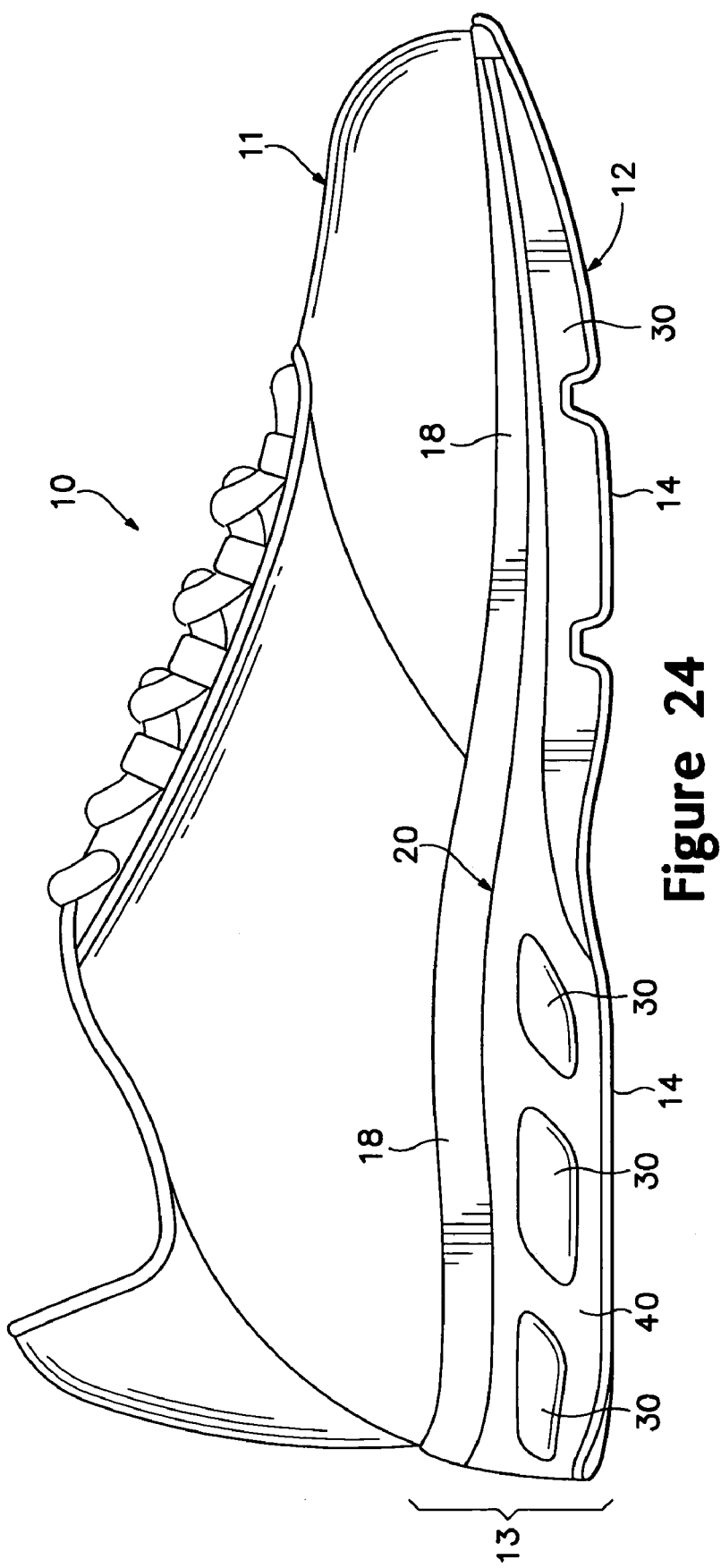
FIG. 24 is a lateral side elevational view of an article of footwear having a sixth sole component in accordance with the present invention.

Sole component 20 may be directly bonded to upper 11, as depicted in FIG. 1. As an alternative, polymer foam material 18 may extend between sole component 20 and upper 11, as depicted in FIG. 24. Accordingly, an upper surface of foam material 18 may be bonded to upper 11, and sole component 20 may be bonded to a lower surface of foam material 18. Foam material 18 is depicted as having approximately one-half the height of sole component 20, but the relative thicknesses of foam material 18 and sole component 20 may vary significantly.

The materials selected for bladder 30 and reinforcing structure 40 may exhibit different mechanical properties, such as the modulus of elasticity. In addition to mechanical properties, however, the materials selected for bladder 30 and reinforcing structure 40 may also exhibit different visual properties. For example, bladder 30 may be formed of a generally clear material, whereas reinforcing structure 40 may be formed of a generally translucent or opaque material. In addition, the colors of bladder 30 and reinforcing structure 40 may vary. Accordingly, examples of visual properties that may vary include the clarity and/or colors of the materials forming sole component 20.

Figure 25:
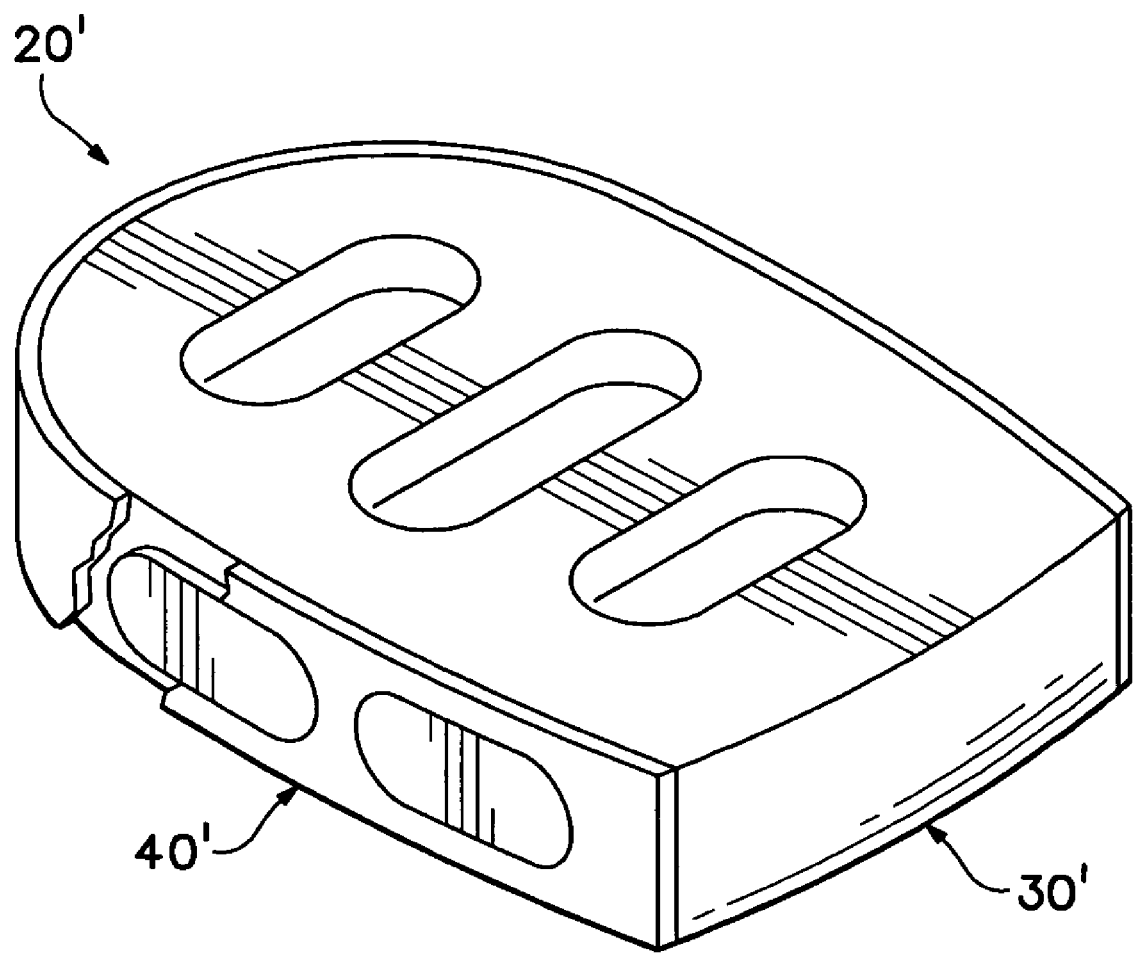
FIG. 25 is a perspective view of a seventh sole component in accordance with the present invention.

A sole component 20' is depicted in FIG. 25 as incorporating a bladder 30' and a reinforcing structure 40' bonded to the exterior of bladder 30'. As with sole component 20, reinforcing structure 40' forms a reinforcing cage that is bonded or otherwise secured to an exterior of bladder 30'. In general, reinforcing structure 40' generally extends around portions of the periphery of bladder 30', and portions of reinforcing structure 40' extend along side surfaces of bladder 30'. Reinforcing structure 40' extends, therefore, between upper and lower surfaces of bladder 30'. In addition, the material forming reinforcing structure 40' may exhibit a greater modulus of elasticity than the material forming bladder 30'. Accordingly, the configuration and material properties of reinforcing structure 40' may impart reinforcement to bladder 30'.

When incorporated into an article of footwear, sole component 20' may be encapsulated within a polymer foam material, such as polyurethane or ethylvinylacetate. Accordingly, sole component 20' may replace a conventional fluid-filled bladder within a conventional sole structure of an article of footwear. Portions of sole component 20' may be exposed through apertures in the foam material so as to be visible from an exterior of the footwear, or sole component 20' may be entirely encapsulated by the foam material. Sole component 20' may also have more than one chamber with fluids of differing pressure.

CONCLUSION

The preceding discussion disclosed various embodiments of a sole component and a method of manufacturing the sole component. In general, the sole component includes a fluid-filled bladder and a reinforcing structure extending around the bladder. The reinforcing structure is bonded to the exterior of the bladder, and may be recessed into the bladder. In some embodiments, the reinforcing structure extends along the side surfaces of the bladder and between upper and lower surfaces of bladder. In manufacturing the sole component, the reinforcing structure may be located within a mold, and the polymer material forming the bladder may be bonded to the reinforcing structure during the molding process.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A sole component for an article of footwear, the sole component comprising:
    a bladder formed of a barrier material that encloses a pressurized fluid, the bladder having a first surface, an apposite second surface, and a sidewall extending between the first surface and the second surface; and
    a reinforcing structure bonded to the bladder, the reinforcing structure including:
        a first portion positioned at an interface of the first surface and the sidewall,
        a second portion spaced from the first portion and positioned at an interface of the second surface and the sidewall, and
        a plurality of connecting portions extending adjacent to the sidewall and between the first portion and the second portion, the connecting portions being recessed into sidewall,
    wherein the sidewall has a first area that is covered by the connecting portions and a second area that is exposed to an exterior of the sole component, the first area. being less than the second area.

2. The sole component recited in claim 1, wherein the first portion extends along a lateral side of the bladder, around a heel region of the bladder, and along a medial side of the bladder.

3. The sale component recited in claim 2, wherein at least one bridge member extends across the bladder and connects opposite sides of the first portion.

4. The sole component recited in claim 1, wherein at least one of the connecting portions is inclined.

5. The sole component recited in claim 1, wherein spaces are formed between the connecting portions.

6. The sole component recited in claim 5, wherein one of the spaces is positioned in a rear-lateral region of the sole structure.

7. The sole component recited in claim 1, wherein a material forming the reinforcing structure has a greater modulus of elasticity than the barrier material.

8. The sole component recited in claim 1, wherein a material forming the reinforcing structure has a greater stiffliess than the barrier material.

9. The sole component recited in claim 1, wherein the reinforcing structure includes extensions that extend outward from the bladder.

10. The sole component recited in claim 1, wherein the reinforcing structure includes vent apertures that release air from between the bladder and the reinforcing structure.

11. The sole component recited in claim 1, wherein the reinforcing structure extends between the first surface and the second surface only in a midfoot region and a heel region of the sole component.

12. The sole component recited in claim 1, wherein the barrier material includes a first barrier layer that forms the first surface and the sidewall, and the barrier material includes a second barrier layer that forms the second surface.

13. The sole component recited in claim 12, wherein the reinforcing structure is bonded only to the first barrier layer.

14. The sole component recited in claim 1, wherein edges of the reinforcing structure are beveled.

15. The sole component recited in claim 1, the connecting portions are in tension when the sole component is in an uncompressed state.

16. A sole component for an article of footwear, the sole component comprising:
    a bladder formed of a barrier material that encloses a fluid; and
    a reinforcing structure at least partially recessed into the barrier material and bonded to the barrier material,
    wherein an exposed surface of the bladder is exposed to an exterior of the sole component, and an exposed surface of the reinforcing stmcture is exposed to the exterior of the sole component, the exposed surface of the bladder being substantially co-planar with the exposed surface of the reinforcing structure at an interface between the exposed surface of the bladder and the exposed surface of the reinforcing structure.

17. The sale component recited in claim 16, wherein at least a portion of the exposed surface of the bladder that is spaced from the interface bulges outward to form a convex area of the exposed surface of the bladder.

18. The sole component recited in claim 16, wherein the reinforcing structure has a first portion, a second portion, and a plurality of connecting portions extending between the first portion and the second portion.

19. The sole component recited in claim 18, wherein the first portion is secured to the bladder at an interface between a first surface end a sidewall, and the second portion is secured to the bladder at an interface between a second surface and the sidewall, the first surface being positioned opposite the second surface.

20. The sole component recited in claim 19, wherein the first portion extends along a lateral side of the bladder, around a heel region of the bladder, and along a medial side of the bladder.

21. The sole component recited in claim 20, wherein at least one bridge member extends laterally across the bladder and connects opposite sides of the first portion.

22. The sole component recited in claim 19, wherein at least one of the connecting portions is inclined.

23. The sole component recited in claim 19, wherein spaces are formed between the connecting portions.

24. The sole component recited in claim 23, wherein one of the spaces is positioned in a rear-lateral region of the sole structure.

25. The sole component recited in claim 16, wherein a material forming the reinforcing structure has a greater modulus of elasticity than the barrier material.

26. The sole component recited in claim 16, wherein a material forming the reinforcing structure has a greater stiffness than the barrier material.

27. The sole component recited in claim 16, wherein the reinforcing structure includes extensions that extend outward from the bladder.

28. The sole component recited in claim 16, wherein the reinforcing structure includes vent apertures that release air from between the bladder and the reinforcing structure.

29. The sole component recited in claim 16, wherein the barrier material includes a first barrier layer that forms a first surface and a sidewall, and the baffler material includes a second barrier layer that forms a second surface, the first surface being opposite the second surface.

30. The sole component recited in claim 29, wherein the reinforcing structure is bonded only to the first barrier layer.

31. The sole component recited in claim 16, wherein edges of the reinforcing structure are beveled.

32. The sole component recited in claim 16, wherein a portion of the reinforcing structure is in tension when the sole component is m an uncompressed state.

* * * * *

UNITED STATES PATENT AND TRADEMARK OFFICE
CERTIFICATE OF CORRECTION

PATENT NO.       : 7,086,180 B2
APPLICATION NO.  : 10/767212
DATED            : August 8, 2006
INVENTOR(S)      : Frederick J. Dojan et al.

It is certified that error appears in the above-identified patent and that said Letters Patent is hereby corrected as shown below:

In Claim 1, Column 23, Line 50:
    Please delete "apposite" and insert --opposite--

In Claim 1, Column 23, Line 66:
    Please delete "first area. being" and insert --first area being--

In Claim 3, Column 24, Line 5:
    Please delete "sale" and insert --sole--

In Claim 8, Column 24, Line 20:
    Please delete "stiffliess" and insert --stiffness--

In Claim 16, Column 24, Line 51:
    Please delete "stmcture" and insert --structure--

In Claim 17, Column 24, Line 57:
    Please delete "sale" and insert --sole--

In Claim 19, Column 24, Line 67:
    Please delete "end" and insert --and--

In Claim 23, Column 25, Line 14:
    Please delete "arc" and insert --are--

In Claim 29, Column 26, Line 9:
    Please delete "baffler" and insert --barrier--

UNITED STATES PATENT AND TRADEMARK OFFICE
CERTIFICATE OF CORRECTION

PATENT NO. : 7,086,180 B2
APPLICATION NO. : 10/767212
DATED : August 8, 2006
INVENTOR(S) : Frederick J. Dojan et al.

It is certified that error appears in the above-identified patent and that said Letters Patent is hereby corrected as shown below:

In Claim 32, Column 26, Line 18:
    Please delete "m" and insert --in--

Signed and Sealed this

Eighth Day of April, 2008

JON W. DUDAS
*Director of the United States Patent and Trademark Office*